(12) United States Patent
Kumar et al.

(10) Patent No.: US 7,334,132 B1
(45) Date of Patent: Feb. 19, 2008

(54) FLEXIBLE AND SCALABLE ARCHITECTURE FOR TRANSPORT PROCESSING

(75) Inventors: Nishit Kumar, San Jose, CA (US); Timothy Vogt, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 804 days.

(21) Appl. No.: 10/608,301

(22) Filed: Jun. 27, 2003

(51) Int. Cl.
*H04L 9/00* (2006.01)
*H04K 1/00* (2006.01)
*H04J 15/00* (2006.01)
*G06F 15/16* (2006.01)

(52) U.S. Cl. .................. 713/189; 370/466; 709/230
(58) Field of Classification Search ............... None
See application file for complete search history.

(56) References Cited

U.S. PATENT DOCUMENTS

| | | | | |
|---|---|---|---|---|
| 5,486,865 A | * | 1/1996 | James ...................... 348/465 |
| 5,623,308 A | * | 4/1997 | Civanlar et al. ....... 375/240.01 |
| 6,311,161 B1 | * | 10/2001 | Anderson et al. ........... 704/500 |
| 6,438,137 B1 | * | 8/2002 | Turner et al. ................ 370/466 |
| 6,721,957 B1 | * | 4/2004 | Lawrence ................... 725/114 |
| 7,113,998 B1 | * | 9/2006 | Stern et al. ................. 709/231 |
| 7,280,566 B2 | * | 10/2007 | Okamoto et al. ........... 370/542 |
| 2001/0005380 A1 | * | 6/2001 | Weis ......................... 370/466 |
| 2003/0091003 A1 | * | 5/2003 | Wang et al. ................ 370/252 |
| 2004/0019913 A1 | * | 1/2004 | Wong et al. ................ 725/139 |
| 2004/0267955 A1 | * | 12/2004 | Konetski et al. ............ 709/231 |

* cited by examiner

*Primary Examiner*—Christopher Revak
(74) *Attorney, Agent, or Firm*—Blakely Sokoloff Taylor & Zafman LLP

(57) ABSTRACT

A transport processor that can be used in a digital audio-video receiver system comprises a front end and a memory interface. The front end receives concurrently a plurality of transport streams, where two or more of the plurality of transport streams can have different formats, and each transport stream includes a plurality of packets. The front end includes a packet processor to create an aggregate transport stream in a single format from the plurality of transport streams. The memory interface is an interface through which the transport processor can store the aggregate transport stream in a memory for use by subsequent decode and display operations.

39 Claims, 19 Drawing Sheets

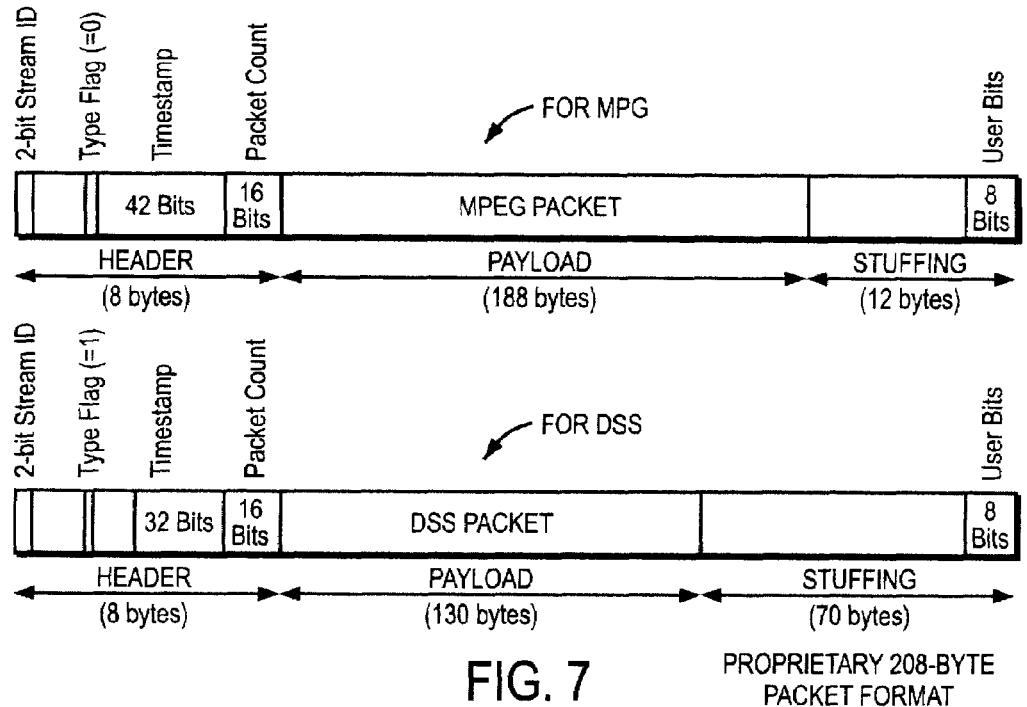
FIG. 7   PROPRIETARY 208-BYTE PACKET FORMAT
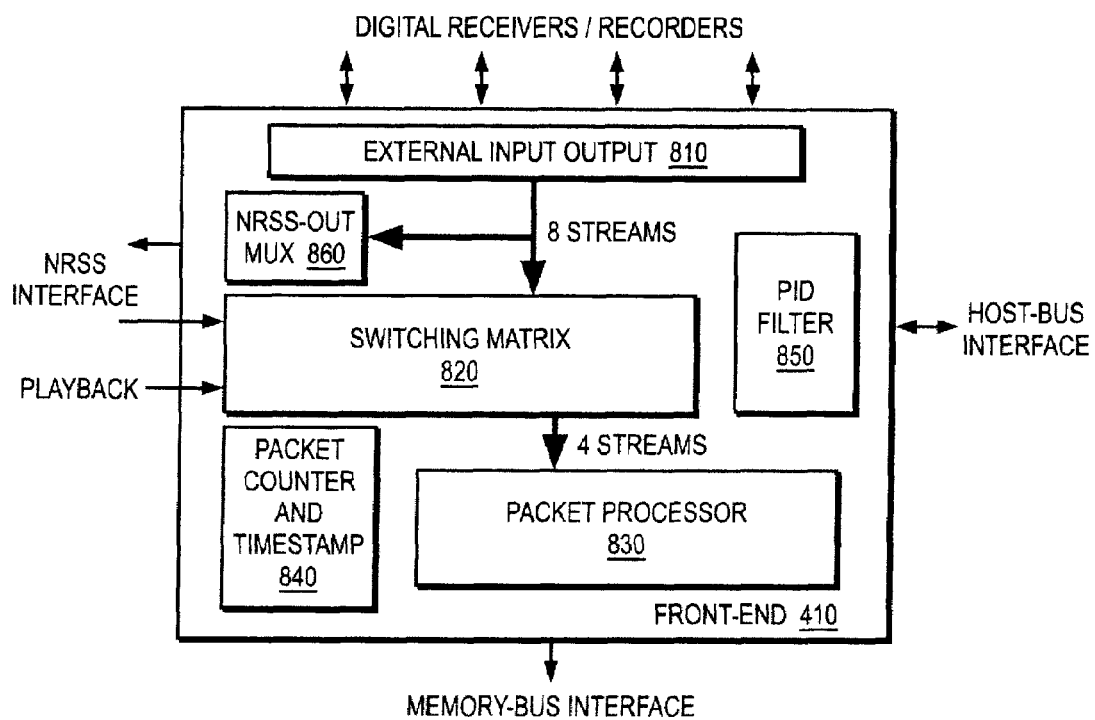
FIG. 8

■□□□□□□□ □□□□□□□□ □□□□□■□□ □□□□□□□□ □□□□□□□□ □□□□■□□□ □□□□□□□□ □□□□□□□■ □□□□□□□□ □□□□□□□□
FULL TRANSPORT: PLAYBACK RUNNING AT CONSTANT KNOWN RATE

1510

■□□ □ □□ □  □□ □ □□□□■ □  □□ □□ □□  □  □ ■□□□     □□ □□ ■□□□ □□□ □ □□ □
PARTIAL TRANSPORT: PLAYBACK RUNNING IN TIMESTAMP-PER-PACKET MODE

1520

■□□□□□□□ □□□□□    ■□□ □□□□□□□        ■□□□ □□□□      ■ □□□□□□□□ □□
PARTIAL TRANSPORT: PLAYBACK RUNNING IN TIMESTAMP-PER-CHUNK MODE
■ = CHUNK LEAD PACKET
(typically a PCR Packet)

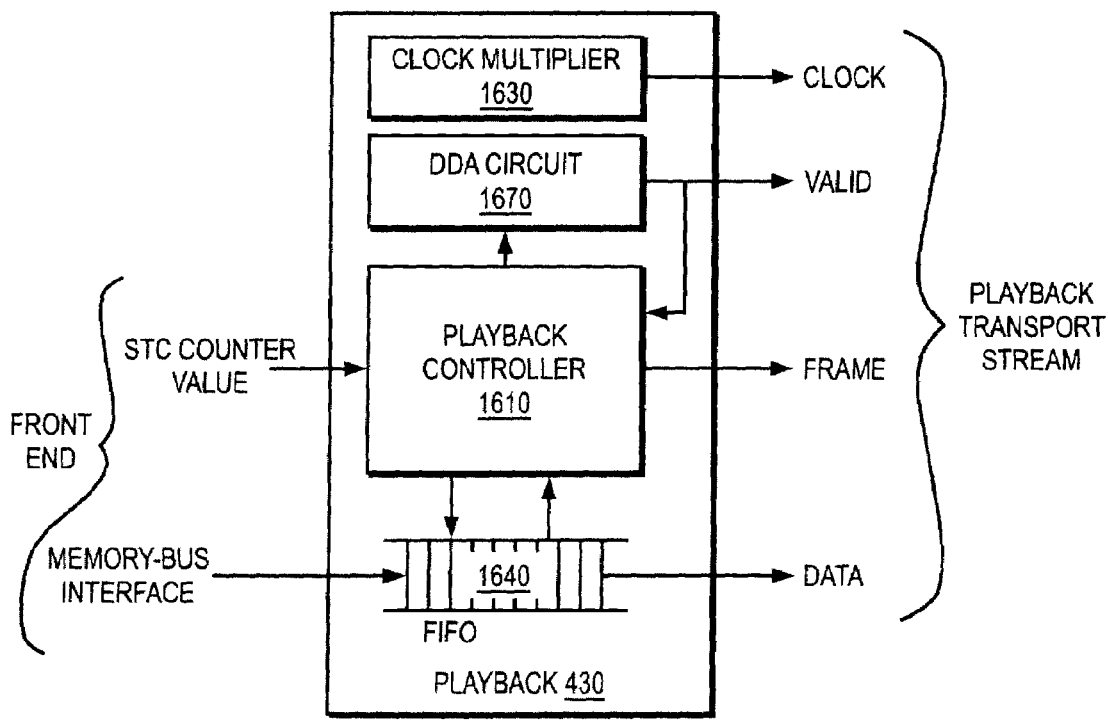

FIG. 16

*Throughput of the Descrambling Algorithms*

| Descrambling Algorithm | #cycles per 8 bytes | Thruput 108 MHz (in Mbps) | Thruput 150 MHz (in Mbps) | Thruput 180 MHz (in Mbps) |
|---|---|---|---|---|
| Multi-2 | 36 | 192 | 267 | 320 |
| DSS DES-ECB | 28 | 247 | 343 | 411 |
| DVB | 65 | 106 | 148 | 177 |
| MPEG DES-ECB | 28 | 247 | 343 | 411 |
| Triple-DES CBC | 72 | 96 | 133 | 160 |

*Number of Streams That can be Descrambled For Different Broadcasts*

| Broadcast Type | Algorithm Required | Strm Rate (Mbps) | #Sturms Descr 108 MHz | #Sturms Descr 150 MHz | #Sturms Descr 180 MHz |
|---|---|---|---|---|---|
| Europe DVB* | DVB | 60 | 1.8 | 2.5 | 3.0 |
| Terrestrial US | Triple DES | 19.4 | 4.9 | 6.9 | 8.2 |
| DirecTV US | DSS DES | 38.8 | 6.4 | 8.8 | 8.8 |
| DirecTV Japan** | DVB | 40 | 2.7 | 3.7 | 4.4 |
| ARIB BS4 Japan | Multi-2 | 28.04 | 6.8 | 9.5 | 9.5 |
| ATSC Cable** | Triple DES | 38.8 | 2.5 | 3.4 | 4.1 |
| Echostar US | DVB | 24 | 4.4 | 6.2 | 7.4 |

\* 60 Mbps contains close to 10 programs, out of which we would descramble 2 or 3. So the effective rate is more like 20 Mbps
\*\* Likewise for these cases as well, a stream is packed with numerous programs, and we would descramble only a few.

*Number of Streams That Can be DescrambledFor Different Broadcasts*

| Descrambling Algorithm | #StdDefnPgms Descr 108 MHz | #StdDefnPgms Descr 150 MHz | #StdDefnPgms Descr 180 MHz | #HiDefnPgms Descr 108 MHz | #HiDefnPgms Descr 150 MHz | #HiDefnPgms Descr 180 MHz |
|---|---|---|---|---|---|---|
| Multi-2 | 32 | 44 | 53 | 10 | 14 | 17 |
| DSS DES | 41 | 57 | 69 | 13 | 18 | 21 |
| DVB | 18 | 25 | 30 | 6 | 8 | 9 |
| MPEG DES | 41 | 57 | 69 | 13 | 18 | 21 |
| Triple-DES | 16 | 22 | 27 | 5 | 7 | 8 |

Note: For this table we assume SD-Rate=6Mbps/program
HD-Rate=19.2Mbps/program

FIG. 18

FLEXIBLE AND SCALABLE ARCHITECTURE FOR TRANSPORT PROCESSING

FIELD OF THE INVENTION

This invention relates to digital audio and video processing and particularly concerns system and methods for performing transport related functions in a digital video receiver.

BACKGROUND

Digital video is being used in an increasing array of applications ranging from personal computers (PC) and videoconferences to digital televisions (TVs), set-top boxes, and personal video recorders (PVR). These varied video processing systems have a myriad of content delivery types, ranging from cable, satellite, and terrestrial broadcasts, to streaming video and video-on-demand over the Internet. Despite attempts to standardize, these delivery infrastructures (e.g., DirecTV, ATSC, DVB, US Cable, and ARIB) vary in their formats, conditional access standards, and demultiplexing requirements. Furthermore, these video products are getting more-and-more interactive and sophisticated, and are evolving in the features and services they support.

Demands of high performance and flexible systems with capabilities to address such varying standards and formats and evolving features have created many design challenges. Therefore, there is a need in the technology to develop a flexible and scalable Transport Processor architecture that addresses these varied applications, different content delivery systems, varied formats and standards, and evolving features and requirements.

SUMMARY OF THE INVENTION

A method and apparatus for a multi-stream transport architecture is described.

BRIEF DESCRIPTION OF THE DRAWINGS

The present invention is illustrated by way of example, and not by way of limitation, in the Figures of the accompanying drawings and in which like reference numerals refer to similar elements and in which:

FIG. 7 is a diagram showing one embodiment of a proprietary transport packet format.

FIG. 8 is a diagram illustrating one embodiment of the Front-End module.

FIG. 15 is a diagram illustrating one embodiment of the modes of operation for the Playback module FIG. 16 is a diagram illustrating the Playback module, which is part of the Transport Processor, according to one embodiment of the invention

FIG. 18 is a diagram containing three tables illustrating the Descrambler throughputs according to the implementation of one embodiment of the invention.

DETAILED DESCRIPTION

A method and apparatus to perform transport related functions on incoming transport stream(s) from either tuner chip(s) (for broadcast content) or from the memory (for pre-stored content) is described. A Front-End module receives a plurality of transport streams and provides the multiplexers to select the streams that are of interest. Using the PID (Packet ID) filter circuitry in the Front-End, only the packets of interest are retained. After being appended with relevant header and footer information, the relevant packets are written into a common memory buffer. This additional information appended to every packet is used to create an aggregate transport stream, so that a single instantiation of the processing units can handle the aggregate stream. In one embodiment, a proprietary 208-byte per packet format is used to ensure that there is no loss of information. The information appended to each packet, includes, for example, the arrival time of a packet and the transport stream that a packet belongs to.

A Readback circuit reads the packets from the memory buffer one-by-one and sends the packets to the Descrambler circuit for conditional access functions. The descrambled packets are then passed to a flexible microcontroller-based Demultiplexer circuit to provide a myriad of transport demultiplexing functions. The outputs of the Demultiplexer circuit are written into a number of memory buffers for the subsequent decode and display functions.

The Transport Processor also includes a Playback module to read pre-stored transport data content and produce a transport stream at a user-defined rate. The transport stream generated by the Playback module is fed back to the Front-End module to be either sent out to a Digital Recorder device or to be sent for descrambling and demultiplexing.

One of the most appealing aspects of this architecture is that it is scalable with the number of transport streams. The throughput of the main processing units, e.g., the PID Filter, Descrambler, and Transport Demultiplexer, is independent of the number of streams being processed, as long as the aggregate stream satisfies the throughput constraint for each individual processing unit. In a given implementation, the PID Filter, Descrambler, and Demultiplexer provide support for a certain number of fixed contexts for example, in one embodiment the Descrambler provides storage space for four sets of keys. However, each of the processing units is implemented as a single instance, which makes the architecture efficient and scaleable. Furthermore, the throughput of the processing units are independent of the number of streams.

Figure 1:
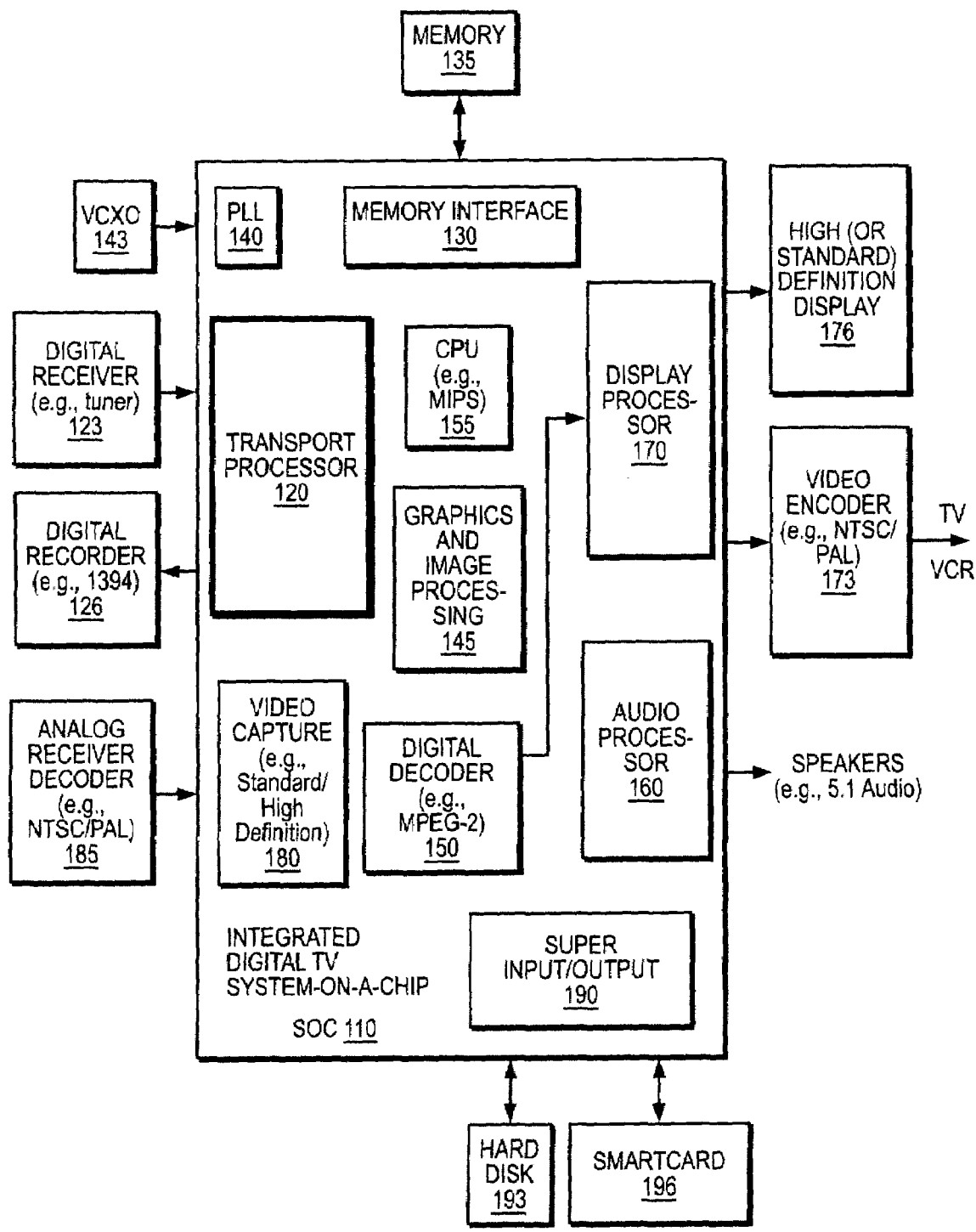
FIG. 1 is a diagram of one embodiment of a complete system-on-a-chip in which the Transport Processor may be used.

FIG. 1 is a diagram illustrating one embodiment of a digital audio/video receiver system in which the invention can be practiced. At the heart of the receiver system is a highly integrated system-on-a-chip (SOC) 110, which contains the Transport Processor 120, the architecture of which is the subject of this invention. In another embodiment, the transport processor may be implemented in multiple integrated circuits, as is known in the art.

The receiver also includes one or more of the following: a VCXO 145 that generates the primary clock for SOC, and Digital Receiver 123 that feeds compressed audio/video data stream into SOC. The receiver may further include a Digital Recorder 126 that stores compressed audio/video data stream from SOC, and/or Analog Receiver and Decoder 185 that feed uncompressed video programs into SOC. The receiver, in one embodiment, further includes Memory 135 that stores temporary variables and data used by the SOC, as well as rest of the components in the system. In one embodiment, the receiver includes a Hard-Disk 193 that stores audio/video content, particularly for PVR functionalities. The receiver may further include a Smartcard 196 that provides conditional access keys. In one embodiment, the receiver also includes or is coupled to a Video Encoder 173 that receives uncompressed video from SOC and creates the relevant format for conventional TVs and VCR. The receiver further includes or is coupled to a High or Standard Definition Display 176 to display video. The receiver system may contain fewer or more components around the SOC than what is shown in FIG. 1, depending on the functionalities supported by that system.

In one embodiment, the system-on-a-chip 110 is a high-performance processor that performs a variety of audio/video (A/V) processing and storage functions used for a number of applications including digital set-top boxes, digital TVs, high definition TVs, and personal video recorders.

In one embodiment, the primary data path built within the SOC 110 takes as input a scrambled, multiplexed, and compressed transport stream, and produces as output the uncompressed audio/video frames to drive a high definition display 176. This is shown pictorially in FIG. 2. The descrambling and demultiplexing functions are performed by the Transport Processor 120, whereas the video decompression is performed by the Digital Decoder 150. The audio decompression and the associated special effects (e.g., audio cross fade and mixing) are implemented within the Audio Processor 160.

In one embodiment, the Display Processor 170 composes several graphics sources (background graphics, scaled graphics, and cursor) and video sources (background video, scaled video) for the final video output. The Display Processor 170 provides circuitry for converting the uncompressed video produced by the Digital Decoder 150 into a number of possible display formats (e.g., interlaced, progressive, 16×9 display, 4×3 display, etc.). The Graphics and Image Processing unit 145 provides additional scaling and blending functions for video and graphics objects.

The Memory Interface 130 services read/write requests from all the internal modules connected via an internal bus. On the outside of the chip, Memory Interface 130 interfaces with a memory 135 (e.g., SDRAM, DDR). In one embodiment, the on-chip integrated CPU 155 is used to not only control the modules within the SOC 110, but also to execute the software stack used to make the receiver system elements work together.

The PLL 140 takes in the clock from the external VCXO 145 and generates all clocks used within the SOC 110, e.g., memory clock, CPU clock, display clock, and core clock. As will be discussed later, in one embodiment, the frequency of this input clock is fine-tuned by the incoming transport stream in the Transport Processor 120, so that the SOC 110 runs at the same frequency as the encoder that was used to compress the audio/video data transmitted to the SOC 110. This is necessary to ensure that video frames are not repeated or dropped.

In another embodiment, the SOC 110 provides support for multiple VCXOs, used for multi-channel or multi-tuner video receiver systems. The SOC 110 in this embodiment has the ability to accurately display video frames (without repeating or skipping) and play sound from two or more independent channels or digital tuners, simultaneously.

In one format, the clock information is embedded within the transport stream in special PCR packets. In one embodiment the Transport Processor 120 provides circuitry to extract this clock information and fine-tune the frequency of the primary clock being generated by the VCXO. In other embodiments the Transport Processor does this for two or more independent VCXOs.

The SOC 110 of FIG. 1, in one embodiment, also includes a Video Capture unit 180 that provides another source for video content. The Video Capture unit 180 is used to capture uncompressed video data from the analog receiver/decoder 185. Furthermore the Super Input/Output unit 190 provides peripheral functions for the SOC 110. In the embodiment of FIG. 1 only a hard-disk interface 193 and a smart card 196 interface are shown because they are relevant to illustrate functionalities on transport data. In practice, an SOC 110 may include additional peripheral functions, such as, GPIOs (general-purpose input output), I$^2$C interfaces, local bus (to connect a flash or EEPROM device required for system boot up, as an example), SPI interfaces (for internet connection), or other types of interfaces.

Figure 2:
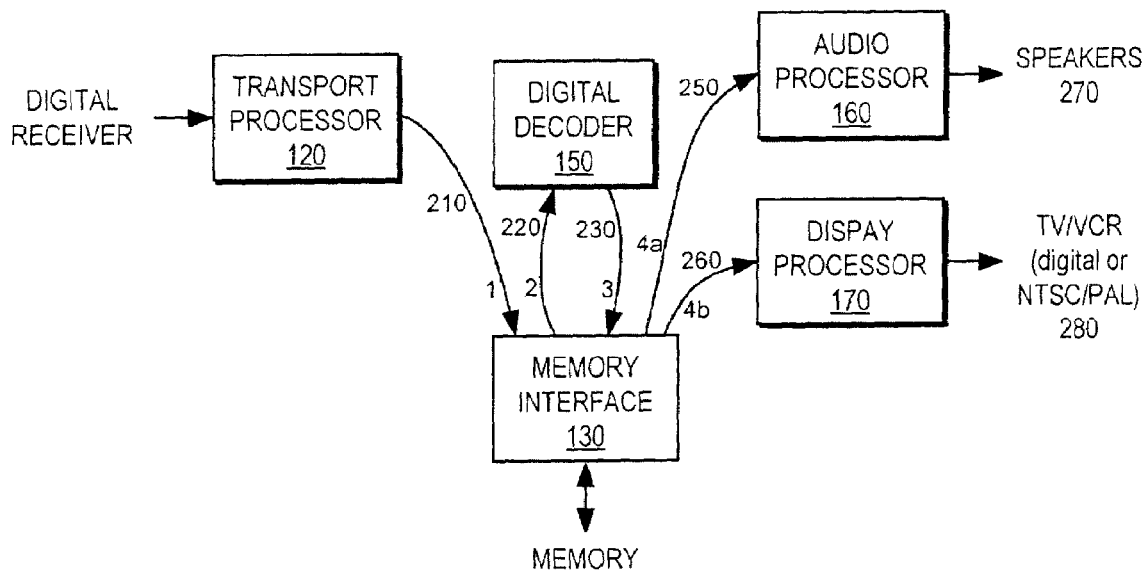
FIG. 2 is a diagram illustrating one embodiment of the primary data-flow of signals received into the system-on-a-chip up to displaying video on a TV/VCR and outputting audio to speakers.

As shown in FIG. 2, in one embodiment, the communication between the Transport Processor 120 and the Digital Decoder 150 go through memory via the memory interface 130. That is, while the Transport Processor 120 is demultiplexing a transport stream and writing out to several memory buffers 210 (e.g., video streams, audio streams, Electronic Program Guide data, etc), the Digital Decoder 150 gets its input 220 from one of the video stream buffers in memory. In one embodiment, the memory is SDRAM.

Likewise the Audio Processor 160 receives audio data 250 for decompression from one of the audio buffers in the Memory for output 270. The output 230 of Digital Decoder 150 is written back to the Memory and subsequently received as input 260 by the Display Processor 170 to generate to the final video out-put(s) 280 of the SOC.

Figure 3:
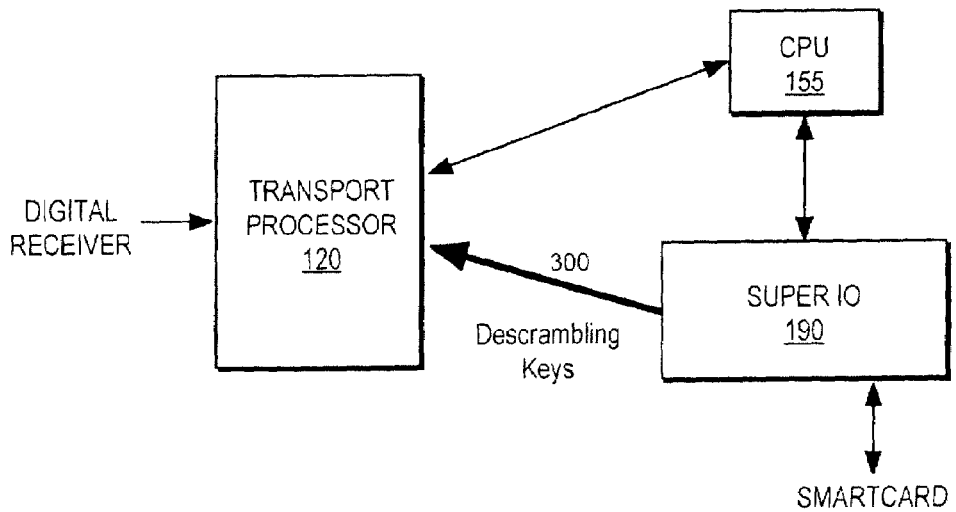
FIG. 3 is a diagram illustrating one embodiment of the data-flow and control-flow within the system-on-a-chip to provide conditional access.

FIG. 3 shows one embodiment of the interaction of the Transport Processor 120 with the CPU 155 and the Super 10 unit 190. These three units work together to provide the conditional access functionalities. One of the functionalities of the Transport Processor 120 is to descramble the transport stream that is received from a Digital Receiver 123. The transport stream itself contains certain control packets (with pre-defined Packet IDs, PIDs) that carry descrambling key information. These packets are filtered and written out 350 into a Memory buffer by the Transport Processor 120 for the security software stack in the CPU 155 to examine. The CPU 155 then communicates 360 with the Super 10 unit 190 to obtain the descrambling keys. For one embodiment, the descrambling keys are obtained through the smartcard interface of the SOC 110. In one embodiment, these keys are programmed 370 in the Transport Processor 120 directly by the Super IO 190 using a private and dedicated DMA channel. The descrambling keys register themselves, and in one embodiment, are designed to be not readable by the CPU 155 in order to enhance security.

Figure 4A:
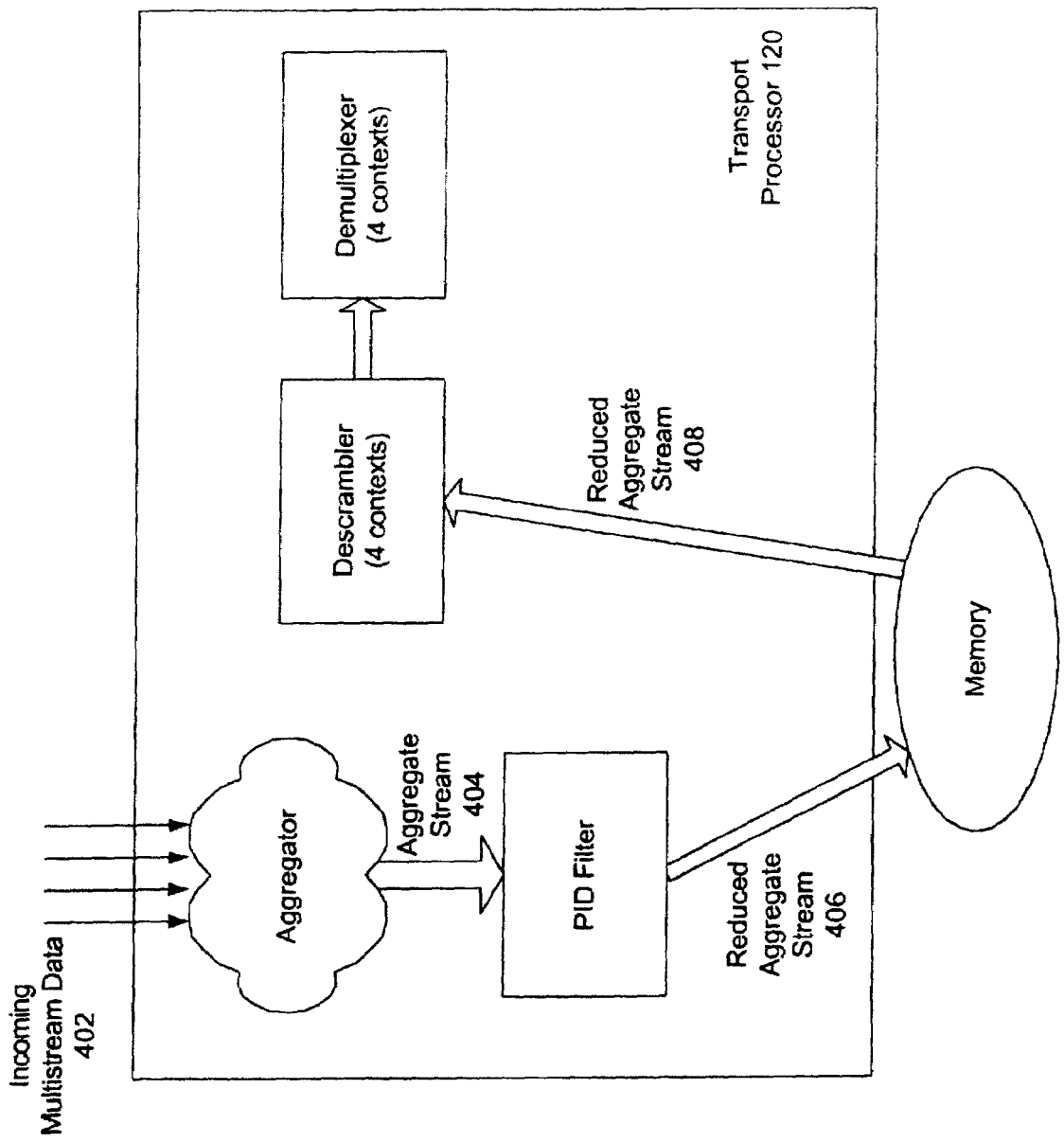
FIG. 4A is a diagram illustrating one embodiment of the Transport Processor according to the present invention.

FIG. 4A shows one embodiment of the transport processor data flow. The incoming multi-stream data 402 is aggregated in the transport processor 120. The aggregated data flow is input 404 to PID filter, which drops any irrelevant packets. The reduced aggregate stream 406 is then passed to the descrambler and demultiplexer. A single instance the descrambler and a single instance of the demultiplexer, in one embodiment, is able to handle four contexts, for example, four streams each with different standards and protocols.

Figure 4B:
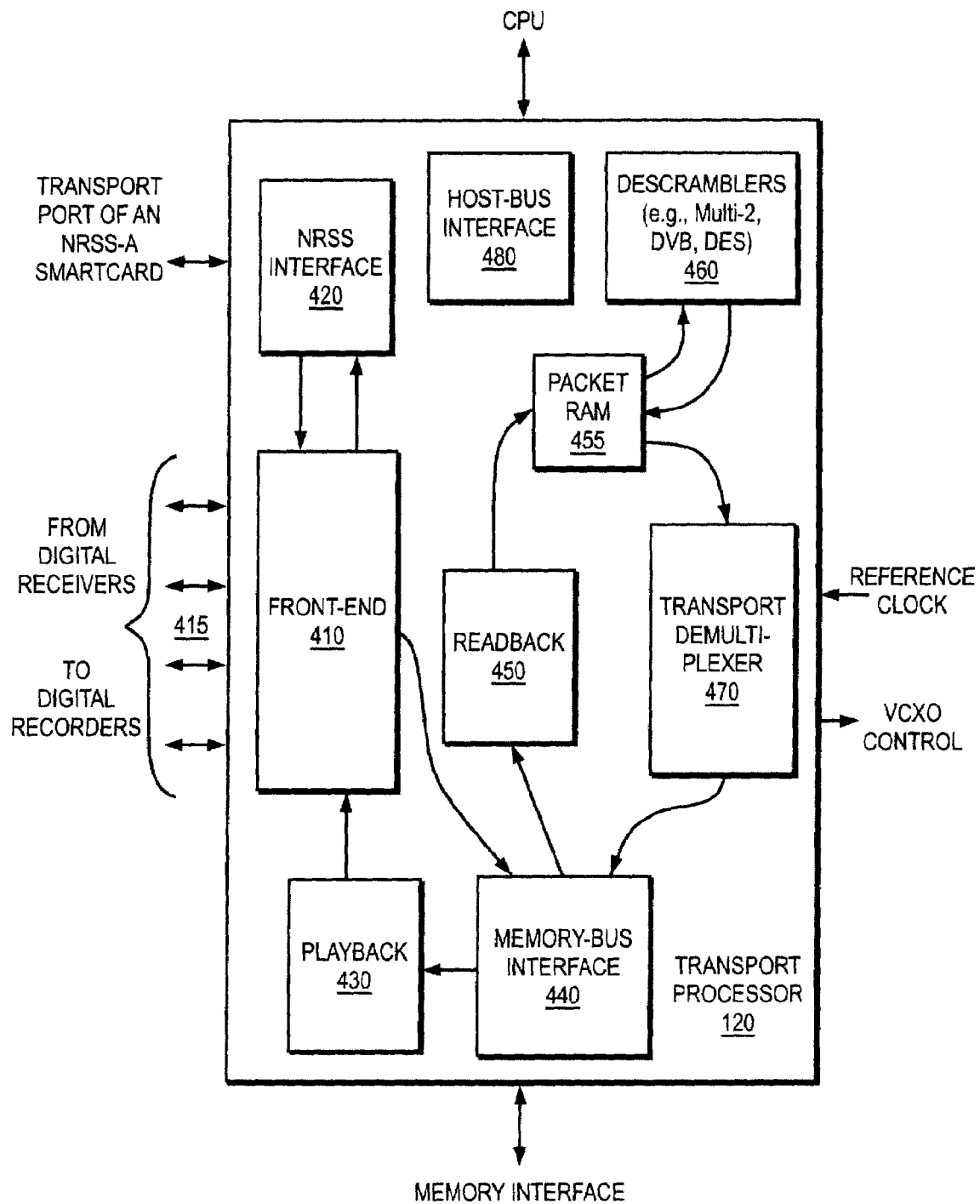
FIG. 4B is a diagram illustrating the first-level micro-architecture of one embodiment of the Transport Processor according to the invention.

FIG. 4B shows one embodiment of the first-level microarchitecture of the Transport Processor 120. The Front-End 410 supports multiple bi-directional parallel transport ports 415. In one embodiment, the Front End 410 supports 4 parallel transport ports. In one embodiment, the transport ports 415 are 11 pin ports, each configurable as two (4-pin) bi-directional serial interfaces. In one embodiment, the transport ports 415 are also configurable as parallel ports. These ports 415 are used to get transport streams in and out of the Transport Processor 120 by interfacing with one or more Digital Receivers and Digital Recorders.

In one embodiment, the Front-End 410 also receives a transport stream from NRSS Interface 420 (National Renewable Security Standard). In one embodiment, the Front End 410 receives another stream from the Playback block 430. Each of these streams can be either in MPEG compliant 188-byte format, DirecTV compliant 130-byte format, or another format. The primary function of Front-End 410 is to send packets from the transport streams to the Memory-Bus Interface 440. In one embodiment, the Front-End 410 sends four of potentially 10 transport streams to the interface 440. In one embodiment, all packets are written to a common memory buffer in a uniform format—e.g. having identical packet sizes. In one embodiment, the packets are in a proprietary 208-byte format. The packets are stored in order of arrival. The Front-End 410, in one embodiment, appends relevant header and footer information to each transport packet (for example, packet arrival-time and stream ID) for subsequent packet-processing. The Front-End 410 also provides a PID Filter circuitry (not shown) to retain only packets that are of interest. This is done to not only improve throughput limitations on the subsequent packet processing units, but also reduce memory bandwidth.

The NRSS Interface 420 is a special-purpose unit designed to handle the transport portion of an NRSS-A smart card, as described in the IEC-679 specification, and the EIA-679A Specification. The NRSS Interface 420 controls three signals: NRSS-OUT, NRSS-IN, and NRSS-CLK. These signals, together with the standard ISO-7816 signals from the smart card port of the Super IO, form the complete interface to an external NRSS-A compliant POD (Point of Deployment) device, providing conditional access.

In many systems the incoming transport stream is doubly scrambled, that is, first with Single-DES and then with Triple-DES. In one embodiment, the external POD descrambles the first layer (Triple-DES) and routes the stream back to the SOC 110. The SOC 110 is responsible for descrambling the second layer. In other systems the incoming transport stream is scrambled with only Triple-DES. In one embodiment, this is descrambled in the external POD, and then re-scrambled with Single-DES for the SOC 110 to descramble. This ensures that communications between the POD and the SOC 110 remain secure.

In one embodiment, the signal NRSS-CLK is chosen to be a divided-down-version of core-clock (for example core-clock/2 or core-clock/4) or any transport clock received from a Digital Receiver 123.

The NRSS Interface 420 includes transmit circuitry, which can route out of the Transport Processor 120 any transport stream that the Front-End 410 receives. For one embodiment, this transmit circuitry serializes the user-programmed transport stream and re-synchronizes it to NRSS-CLK. For one embodiment, this is used for 188-byte format. For another embodiment, the transmit circuitry appends the MPEG synchronization byte (Hexadecimal 47) before serialization and synchronization. For one embodiment, this is used for the 130-byte format. In one embodiment, the NRSS Interface 420 also contains receive circuitry that converts an incoming serial transport (on NRSS-IN) into a parallel transport stream and routes it back to Front-End 410.

The Playback block 430 fetches transport data from buffer in memory and generates transport stream at a user-programmable rate. In one embodiment, the buffer is a circular buffer. This stream gets routed to the Front-End 410. As will be described in greater detail later, the Playback block 430 supports a number of modes to generate partial transport streams precisely. In one embodiment, the gaps in a partial transport stream, corresponding to missing packets, are recreated precisely for MPEG conformance.

The Readback block 450 fetches packets from the circular buffer filled by Front-End 410, and schedules them one-by-one for descrambling (Descrambler 460) and demultiplexing (Transport Demultiplexer 470). In one embodiment, the communication between Readback 450, Descrambler 460, and Transport Demultiplexer 470 happens through a Packet RAM 455. The Packet RAM 455 is 3-packet deep, in one embodiment.

The Readback 450 arbitrates read-write accesses to the Packet RAM 455. In one embodiment, the Readback 450 is only a write client. The Descrambler 460 can both read a scrambled packet from, and write a descrambled packet to, the Packet RAM 455. In one embodiment, every packet, after being descrambled, is read by the Transport Demultiplexer 470, which performs application-specific demultiplexing functions. The output(s) of Transport Demultiplexer 470 are written into the memory buffer(s) through the Memory Bus Interface 440.

In one embodiment, the Demultiplexer 470 also contains circuitry to control the VCXO (Pulse-Width Modulated) Control signal. The VCXO Control signal fine-tunes the frequency of the reference clock generated by the external crystal, and is used to prevent long-term drifts in playing out video. The goal of fine-tuning is to match video display rate in the SOC (decoder side) with the intended rate (encoder side). In one embodiment the Transport Processor provides circuitry required to control two independent VCXOs. This is used for dual high-definition decode and display applications, where the transport (data for the two displays arrive into the SOC through either two channels from the same digital receiver or from two different digital tuners.

The Host-Bus Interface unit 480 provides a common register-programming interface for blocks within the Transport Processor 120. In one embodiment, the Host Bus Interface unit 480 physically contains the storage for programming registers and contains the address decode circuitry for registers as well as internal RAM. It also contains the necessary circuitry to generate interrupts.

The Memory-Bus Interface 440 provides a common memory read-write interface to blocks within the Transport Processor 120. The Memory-Bus Interface 440 provides arbitration logic for the internal blocks to initiate data transfer, on the inside. In one embodiment, the Memory-Bus Interface 440 arbitrates data transfers on the Internal Memory Bus of the SOC (not shown), between Front-End (Writes), Playback (Reads), Readback (Reads), and Transport Demultiplexer (Writes). The Memory-Bus Interface 440 toggles signals relevant to the Internal Memory Bus protocol, on the outside.

Figure 5:
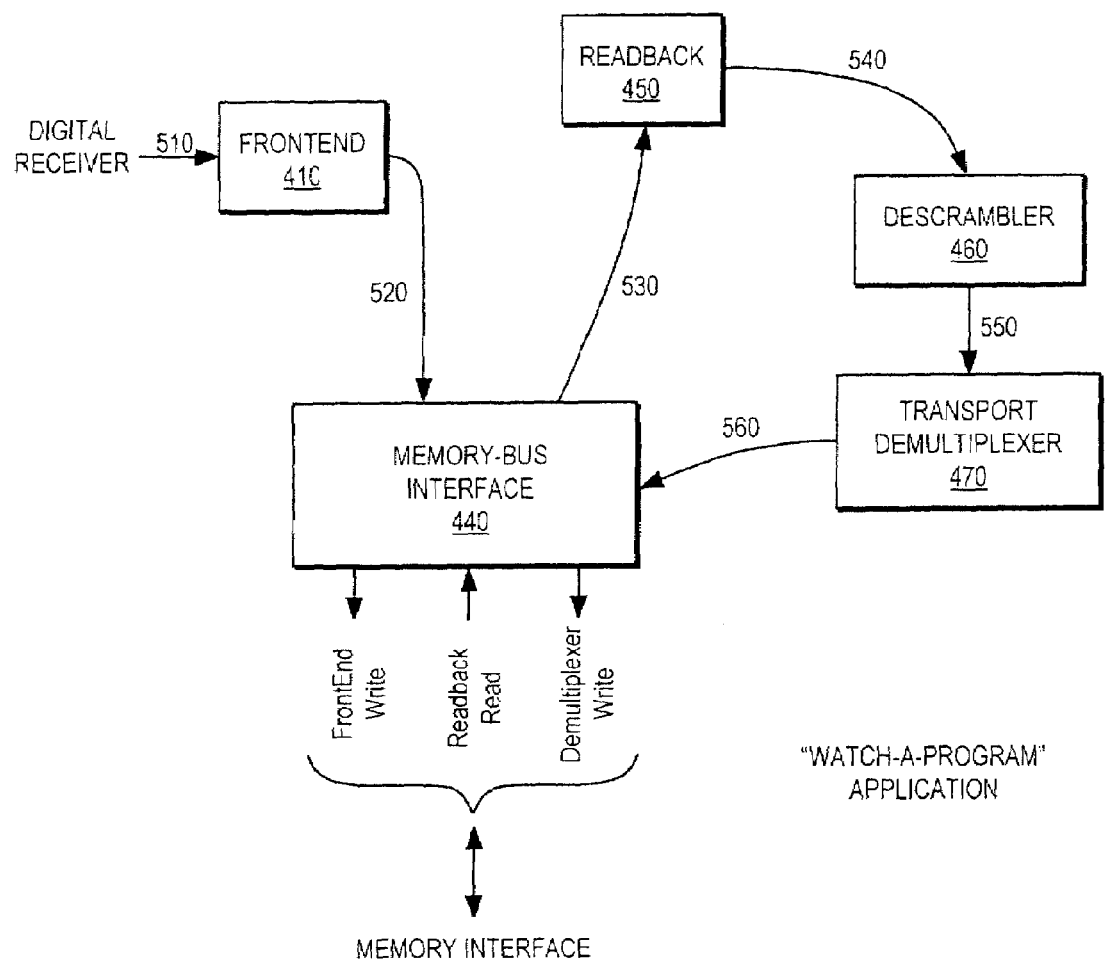
FIG. 5 is a diagram illustrating one embodiment of the data-flow within the Transport Processor to provide a "Watch-a-Program" application.

FIG. 5 shows the dataflow within Transport Processor 120 for a simple "WATCH-A-PROGRAM" application. Digital transport stream 510 is received by the Front-End 410 from a Digital Receiver. Selected transport packets after PID filtering (within Front-End) are appended with their respective arrival times and the stream ID, and are written 520 to a circular buffer in the memory by the Front-End 410 through the Memory-Bus Interface 440. The Readback 450 reads out packets 530 one-by-one from this circular buffer. Each packet is descrambled by the Descrambler 460.

The Transport Demultiplexer 470 then parses descrambled packets and separates out video data, audio data, and control information. The Demultiplexer 470 then writes 560 demultiplexed outputs into separate circular buffers through the Memory-Bus Interface 440. The compressed video data buffer is read out by Digital Decoder (not shown) for MPEG decode and subsequent display. Likewise, the audio buffer is read by Audio Processor (not shown) for decompression and final audio output.

Figure 6:
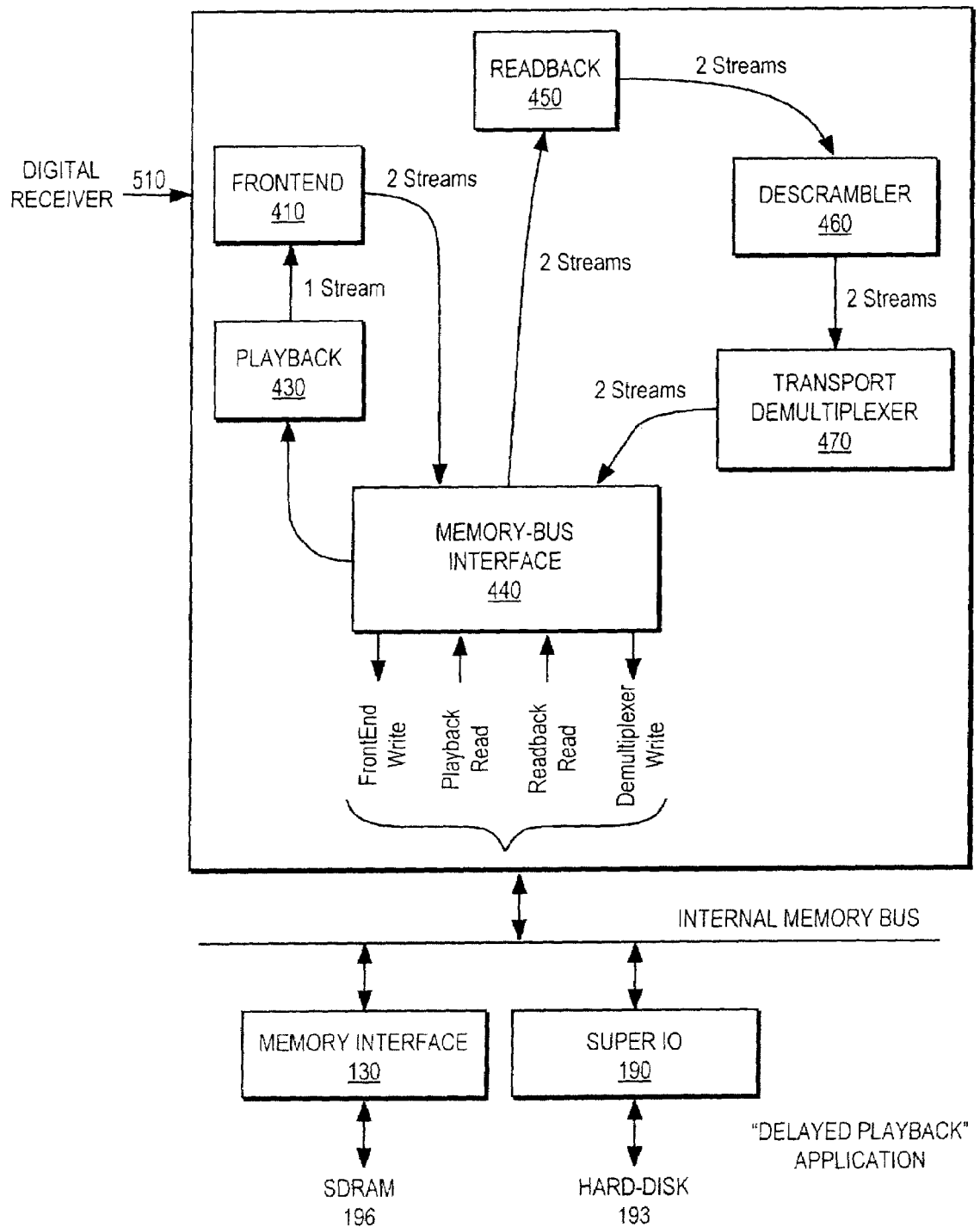
FIG. 6 is a diagram illustrating one embodiment of the data-flow within the Transport Processor to provide a "Delayed Playback" Application.

FIG. 6 shows dataflow for a more complex "DELAYED PLAYBACK" application. This is a common application in PVR systems, where a user can pause live broadcast and watch the broadcast after a fixed delay. In this case the transport stream from the Digital Receiver is handled the same way as the "WATCH-A-PROGRAM". The only difference is that the Transport Demultiplexer 470, instead of parsing and binning the transport packets, simply writes out a transport stream into the Memory through Memory Interface 130.

In one embodiment, the stream written out by the Transport Demultiplexer is a partial transport since the unwanted packets are dropped by the PID filter (not shown). In one embodiment, the Transport Demultiplexer 470, in a PVR application, also writes out a side channel with a table of I-pictures (MPEG standard Intra-coded pictures). This side-channel information is used for random access and navigation of content at a later time. In one embodiment, the partial transport stream is moved from Memory to a hard disk using the DMA (Direct Memory Access) engine in Super IO 190. The data path for the playback video originates from the hard disk 193. In one embodiment, while the recording on the hard disk 193 is in progress, the Super IO 190 can read out previously stored content from the hard disk and send it to a circular buffer in the Memory 196. The data in the circular buffer is read by the Playback unit 430 of the Transport Processor 120. A partial transport stream, with gaps for the missing packets, is re-created by the Playback unit 430 and fed to the Front-End 410. Hence in this application the Front-End 410 writes out packets from two separate streams, although they are only temporally different, after tagging them with stream ID and arrival time stamp. Packets from both streams are written into a common circular buffer in Memory.

The Readback block 450 reads packets from this circular buffer. In one embodiment, only packets from the live stream are descrambled. For the delayed stream, all transport packets are bypassed within the Descrambler 460. The packets from delayed stream are parsed and binned appropriately for subsequent decoding (both audio and video) and display, on similar lines as the "WATCH-A-PROGRAM" application.

FIG. 7 shows one embodiment of the proprietary 208-byte format for packets. These packets are written, in one embodiment, by the Front-End into a memory buffer. The Transport Processor supports MPEG and DirecTV formats, and may support additional formats as well. For MPEG, a 188-byte transport packet is appended with a header and stuffing at the end. In one embodiment, the header is 8-bytes, and the Stuffing is the remaining 12-bytes. The header for MPEG contains a Stream ID and arrival timestamp. In one embodiment, the Stream ID is a 2-bit Stream ID (since a maximum of four streams are written in memory by the Front-End), and the time stamp is a 42-bit MPEG-compliant arrival timestamp. In one embodiment, the header further includes a 1-bit flag set to 0, and a 16-bit packet count. The 12-byte Stuffing has all reserved bytes except one that contains user-programmable bits. The user-programmable bits, for example, may be used for identifying the source of a transport stream (e.g., satellite tuner, terrestrial tuner, IEEE 1394).

The information appended in header and footer of a 208-byte packet are read and used by the Descrambler and the Transport Demultiplexer. In one embodiment, the arrival timestamp is used by the Transport Demultiplexer to perform a hysteresis between PCR timestamps and the arrival timestamp in order to control the VCXO Control signal for PCR locking. Likewise, in one embodiment the stream ID is used by the Descrambler to decide which set of keys should be used to descramble a particular packet.

For DirecTV, a 130-byte transport packet has the same 8-byte header but is stuffed with 70 bytes instead. Everything is similar to MPEG, except that the timestamp field is only (DirecTV compliant) 32 bits wide. It must be emphasized that the Transport Processor architecture is designed with enough flexibility to process any mix of MPEG and DirecTV streams, and the above process may be applied to any other type of stream.

The architecture is optimized such that a single instance of Descrambler and Transport Demultiplexer can handle an aggregate stream of packets that came into the Front-End as different streams. This optimization is possible in the domain of transport processing since a single transport stream is no more than 10 Megabytes/second. On the other hand cost-efficient designs of the Descrambler and Transport Demultiplexer running at a core clock of 100 to 150 MHz can handle much greater throughput. Also since the architecture aggregates several streams and writes them into external memory buffer (usually big enough to hold tens of packets) before processing, there is adequate tolerance for worst-case latencies in the Descrambler and the Transport Demultiplexer.

This advantage is particularly evident if contrasted to transport architectures in which the input stream directly feeds into a chain of Descrambler and Transport Demultiplexer, without being stored in an external memory buffer. In such a cascaded architecture a Descrambler or Demultiplexer has worst-case packet-processing latencies of no more than one packet time, unless there are additional storage elements. Thus, the present architecture removes alleviates the need for this worst-case latency of one packet (in the design of a Descrambler or Demultiplexer) without additional storage elements.

FIGS. 8 through 14 describe one embodiment of the micro-architecture of components used to build the Front-End 410. The Front-End 410, as shown in FIG. 8, contains a flexible and user-configurable External Input/Output sub-block 810 interfacing with a number of Digital Receivers (input ports) and Digital Recorders (output ports). Each of the bi-directional ports can be configured as either a single parallel port (in one embodiment an 11 pin interface with 8-bit data, transport clock, packet start, and byte-valid signal) or a pair of serial ports (in one embodiment each serial port is a 4-pin interface with 1-bit data, transport clock, packet start, and bit-valid signal). In one embodiment, there are four bi-directional ports in the External Input/Output sub-block 810.

In one embodiment, External Input/Output 810 can receive 8 streams, which are sent to the Switching Matrix sub-block 820, where four streams are chosen (based on user configuration) to be sent to Packet Processor 830. The Packet Processor sub-block 830 aggregates packets from the 4 chosen streams and writes them out to a common memory buffer for further processing. It is the Packet Processor 830 that attaches appropriate header and footer information to a transport packet. In one embodiment, the Packet Processor 830 writes the packets out in 208-byte format to Memory. To obtain bit-fields in the header and footer, the Packet Processor 830 also interfaces with Packet Counter and Timestamp sub-block 840. In one embodiment the Timestamp sub-block 840 is instantiated multiple times to allow support for multi-channel or multi-tuner receiver systems. Each Timestamp sub-block contains a counter clocked by the clock generated by an independent VCXO. The Packet Processor 830 can be programmed to choose timestamps from any one of the Timestamp sub-blocks.

The Switching Matrix 820 provides multiplexers to choose 4 streams out of the 8 streams from External Input/Output 810. In one embodiment, the Switching Matrix 820 chooses from the 8 streams from External I/O 810 and a stream each from NRSS (In) Interface and Playback. The NRSS-Out Mux 860 also contains multiplexers to select a stream for the NRSS (Out) Interface. On similar lines as Switching Matrix 820 the potential choices for this selection are 8 streams from External Input/Output and 1 stream from Playback.

As mentioned earlier, the architecture is optimized to contain only one set of Descrambler and Transport Demultiplexer, each capable of handling packets from multiple streams. In one embodiment, the Descrambler and the Transport Demultiplexer can each handle 4 separate streams. In order to reduce throughput of the aggregate stream, in one embodiment, the Front-End also provides a PID Filter 850 that drops unwanted packets based on the PID value. This not only reduces the load on Descrambler and Transport Demultiplexer, but also saves memory bandwidth, for packet writes and reads. The PID Filter 850 contains a bank to store multiple PIDs for each of the streams. In one embodiment, the PID filter 850 stores a total of 128 PIDs from 4 streams. If the PID filter 850 is turned on for a stream, only packets that have a PID matching one of the programmed PIDs are written to memory, and the other packets are dropped. If the PID filter 850 is off, all packets in that stream are written to memory, that is, the PID Filter 850 is bypassed.

Figure 9:
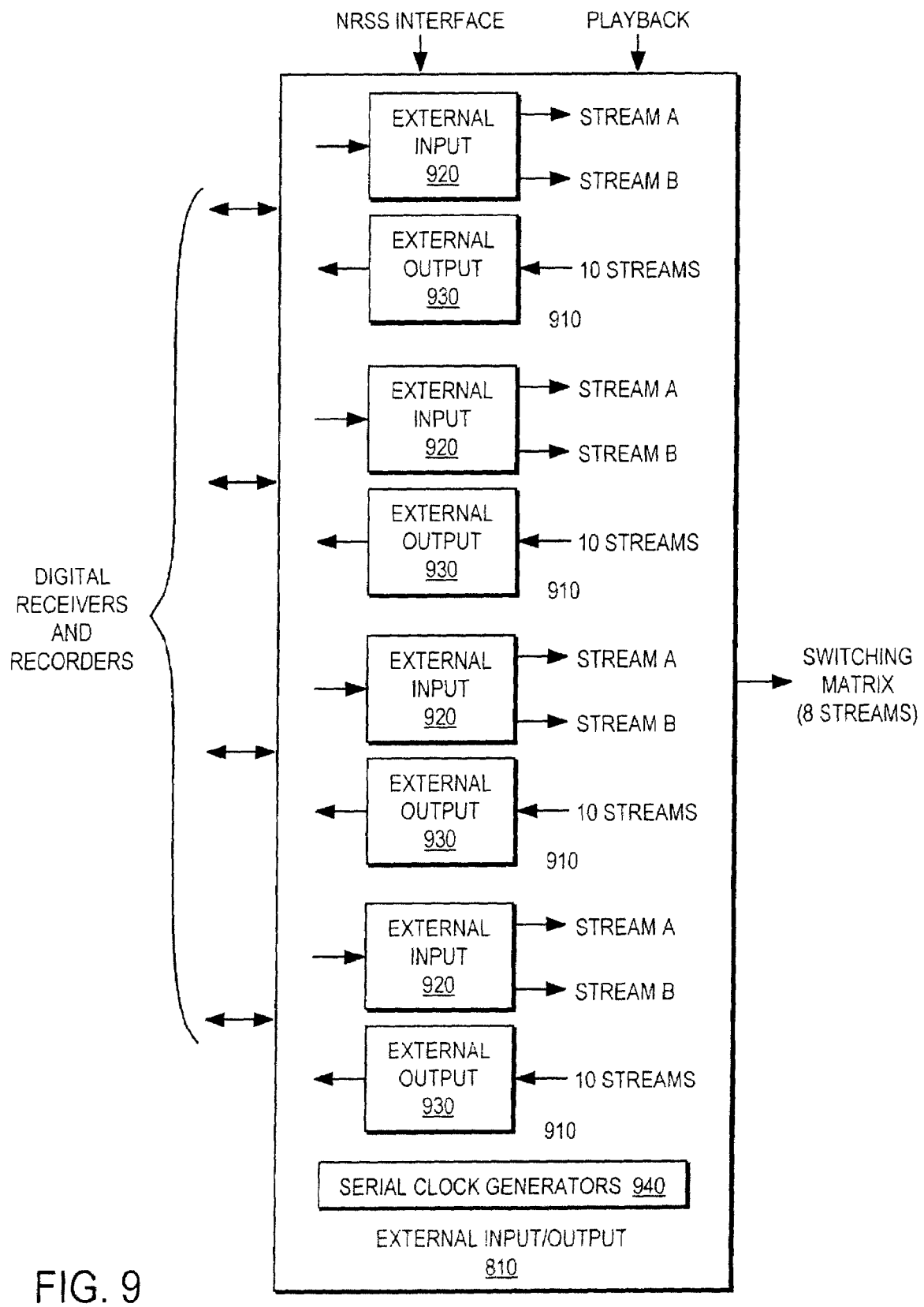
FIG. 9 is a diagram illustrating one embodiment of the external input-output circuitry, which is part of the Front End module.

In one embodiment, the External Input/Output sub-block 810 contains four identical logical units 910 to provide support for four bi-directional ports, as illustrated in FIG. 9. In one embodiment, each port 910 is attached to an instantiation of External Input 920 that potentially routes two input streams (Stream A and Stream B) from the port (when configured in the input mode) to the rest of Front-End. Likewise when the port, or part of the port, is configured as output, a user-chosen stream(s) is routed out of the Transport Processor through the External Output 930. In one embodiment, each External Output 930 unit takes as input 10 different streams (4 Ports×(Stream A+Stream B)+Playback Stream+NRSS Stream), any one of which could be used as source for a transport stream to be sent out to a Digital Recorder.

In one embodiment, the External Input/Output 810 also contains a Serial Clock Generator 940 that divides down the core-clock to provide transport clock source for serial output streams. These clocks are used to route an incoming parallel stream on a serial output port. For example, an input stream of 6 Mbytes/second accompanied by a 6 MHz transport (byte) clock can be routed out as a serial stream using a 54 MHz (bit) clock generated by Serial Clock Generators 940. In one embodiment, the 54 MHz clock would be a divide-by-2 version of 108 MHz core-clock used by the Transport Processor.

Figure 10:
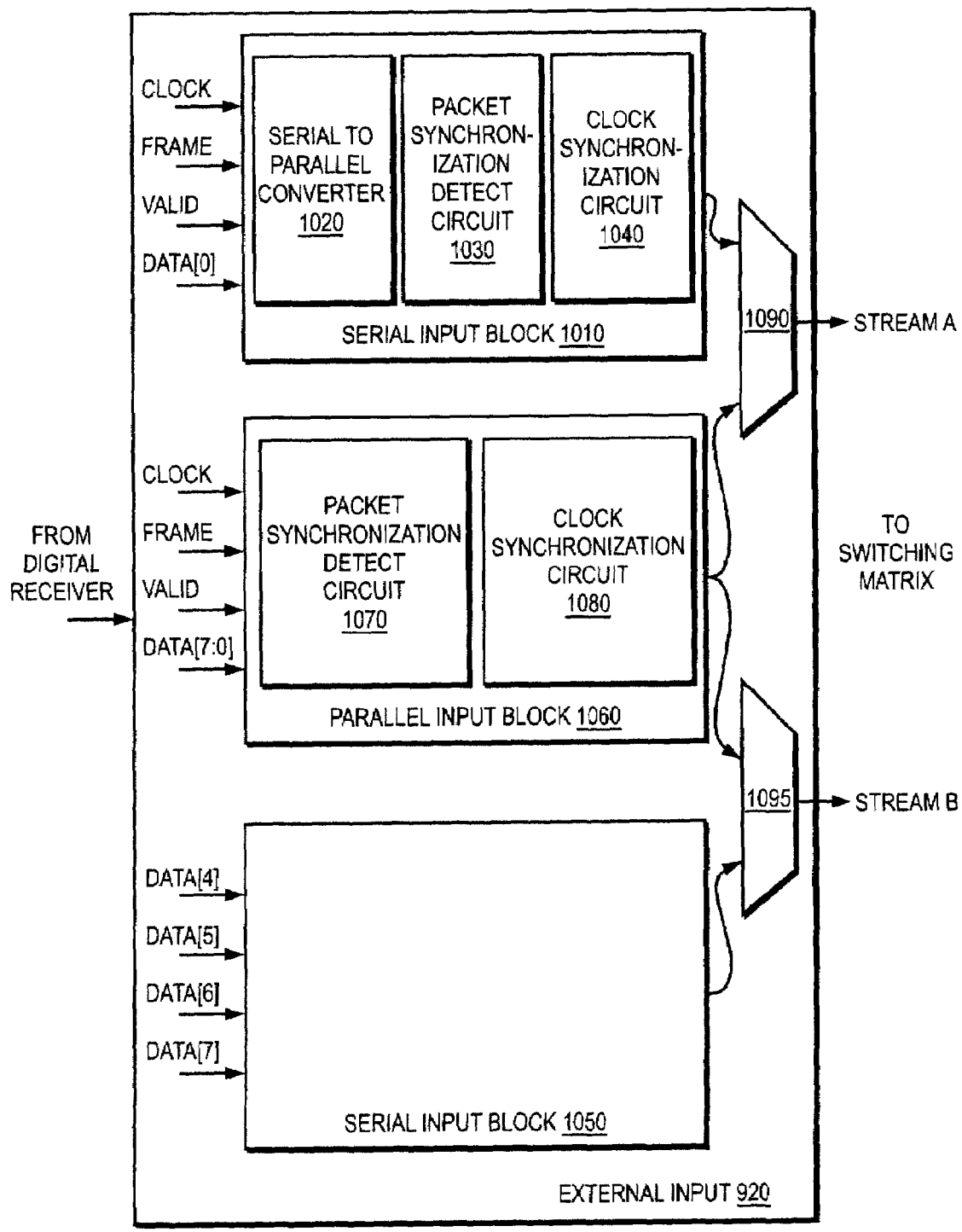
FIG. 10 is a diagram illustrating one embodiment of the external input circuitry.

Each External Input 920 consists of a pair of Serial Input Blocks 1010, 1050 and a Parallel Input Block 1060, as shown in FIG. 10. For a serial input stream, the Serial Input Block 1010 generates a "clean" parallel transport stream in the core-clock domain. The Serial Input Block 1010, 1050 contains a Serial to Parallel Converter circuit 1020 cascaded with a Packet Synchronization circuit 1030 and a Clock Synchronization circuit 1040. The Parallel Input Block 1060 includes a Packet Synchronization Detect Circuit 1070 and a Clock Synchronization circuit 1080.

In one embodiment, the Packet Synchronization circuits 1030, 1070 support two types of synchronization: software synchronization and hardware synchronization. In one embodiment, the user selects the type of synchronization used. In case of software synchronization, in one embodiment, the packet is expected to start with a special codeword (Hexadecimal 47), whereas in the case of hardware synchronization, a frame signal indicates the start of the packet. The Packet Synchronization detection circuit 1030, 1070 in one embodiment, includes a simple hysteresis, which looks for packet starts to occur at the right time before passing transport data further down in the pipeline. The length of hysteresis—that is, the number of packet starts to look before synchronization—is user programmable. In one embodiment, the synchronization detection circuit 1030, 1070 looks for N packet starts. In one embodiment, N is two.

The Clock Synchronization circuits 1040, 1080 convert streams from the slow transport-clock domain into the fast internal core-clock domain. From this circuit onwards, the Transport Processor is clocked by the core clock. In one embodiment, a "clean" transport stream in the transport clock domain is also retained, to be used to route streams out of the Transport Processor through the four External Outputs.

The External Input 920 outputs two streams, Stream A and Stream B. If the External Input 920 is configured as a parallel port, both Stream A and Stream B contain the same incoming parallel transport stream (CLOCK, FRAME, VALID, and DATA [7:0]). If the External Input 920 is configured as a pair of serial ports, Stream A represents the serial transport stream from the 4 pins CLOCK, FRAME, VALID, DATA [0], and Stream B represents the serial transport stream from the 4 pins DATA [4] (for CLOCK), DATA [5] (for FRAME), DATA [6] (for VALID), and DATA [7] (for DATA). In this mode of operation the pins DATA [1], DATA [2] and DATA [3] are unused.

Figure 11:
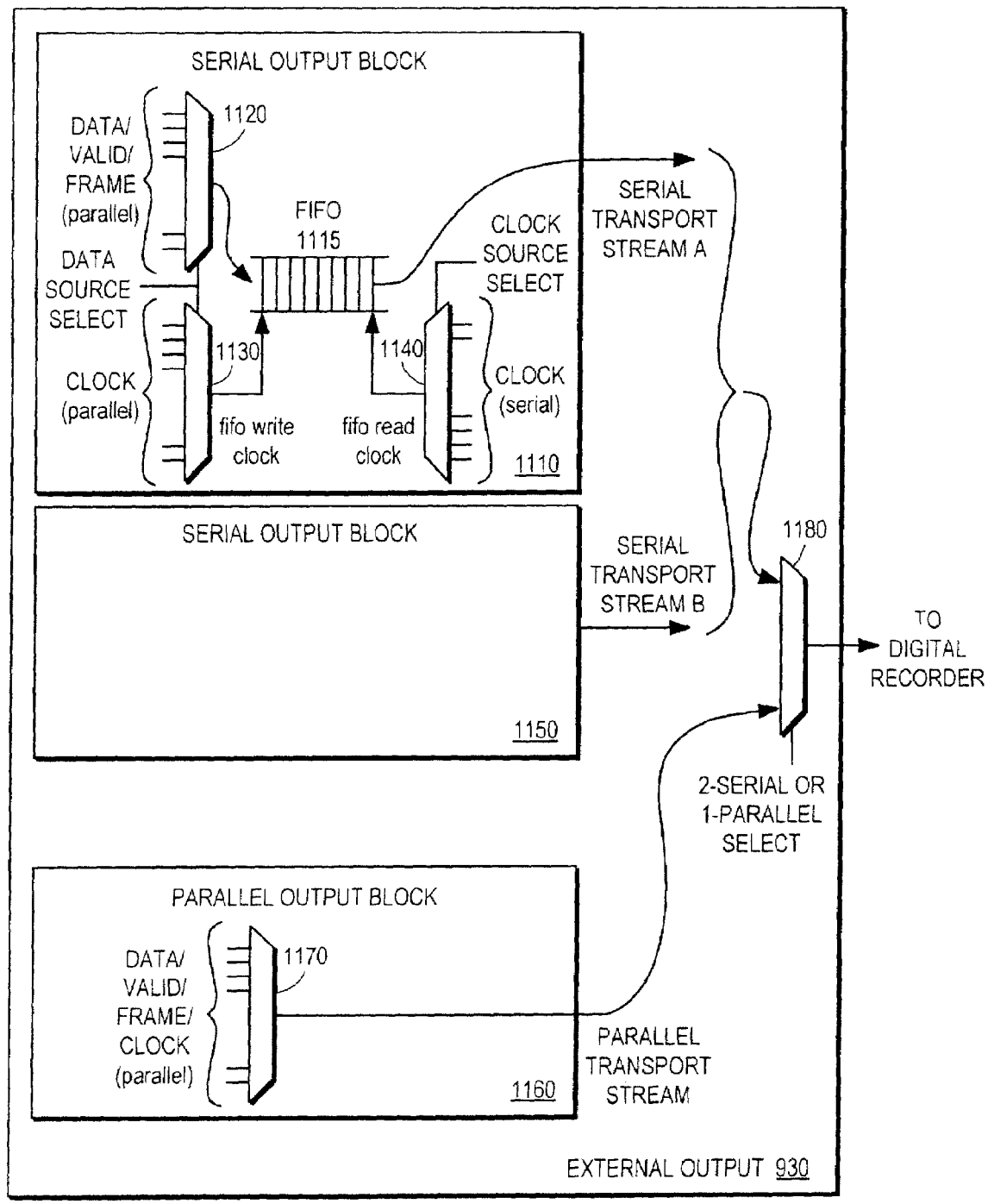
FIG. 11 is a diagram illustrating one embodiment of the external output circuitry.

On similar lines as External Input 920, the External Output 930 consists of a pair of Serial Output Blocks 1110, 1150 and a Parallel Output Block 1160, as shown in FIG. 11. The Parallel Output Block 1160 contains simple multiplexers 1170 to choose a user-programmable transport stream to be routed out on the parallel port to a Digital Recorder. As discussed above, all 8 input transport streams (8=2 Streams each from the other 3 ports+Playback+NRSS) that are inputs to the multiplexer 1070 are already in a normalized parallel transport format; since each serial stream first goes through a Serial to Parallel Converter in External Input.

A Serial Output Block 1110 is however more involved. A user can not only choose transport data source from one of the nine transport streams (9=2 Streams each from the other 3 ports+1 Stream from the other 4 pins on the same port+Playback+NRSS) but also choose an independent source for bit clock. In one embodiment, the multiplexer 1130, 1140 inputs for clock source contains all the 7 incoming clocks and the Playback clock, besides clocks from the Serial Clock Generators (shown in FIG. 9). An asynchronous FIFO 1115 is employed to resample the selected transport stream with an independently chosen FIFO Read clock. The FIFO Read Clock has to be at least eight times faster than the FIFO Write clock (Parallel clock). One of the Serial Output Blocks 1110 outputs Serial Transport Stream A, while the other Serial Output Block 1150 outputs Serial Transport Stream B. Multiplexer 1180 selects whether to output the two serial streams or the one parallel stream.

Figure 12A:
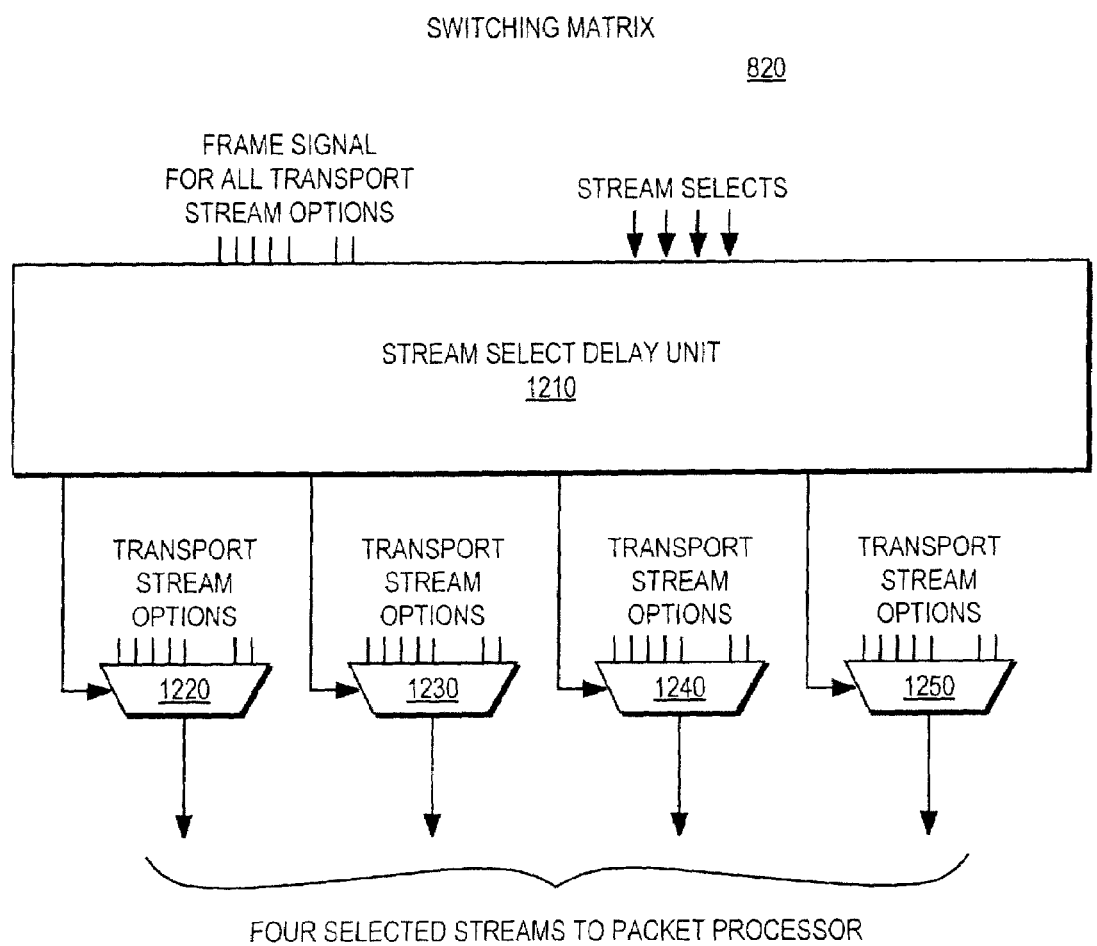
FIG. 12A is a diagram illustrating one embodiment of the switching matrix, which is part of the Front-End module.

The Switching Matrix, as shown in FIG. 12A, contains four sets of multiplexers 1220, 1230, 1240, 1250 to select the four streams to be captured in memory. The Switching Matrix 820 supports dynamic changing of multiplexer selects. That is, the entire Front-End need not be brought down in order to accomplish a switching action from one stream to another. This is used, for example, in record-and-watch applications where starting a program recording should not introduce any glitches in the transport stream (or program) being watched. The support for dynamic switching is provided by the Stream Select Delay Unit 1210, which simply delays the multiplexer select signals to make a switch only on proper packet boundaries.

Figure 12B:
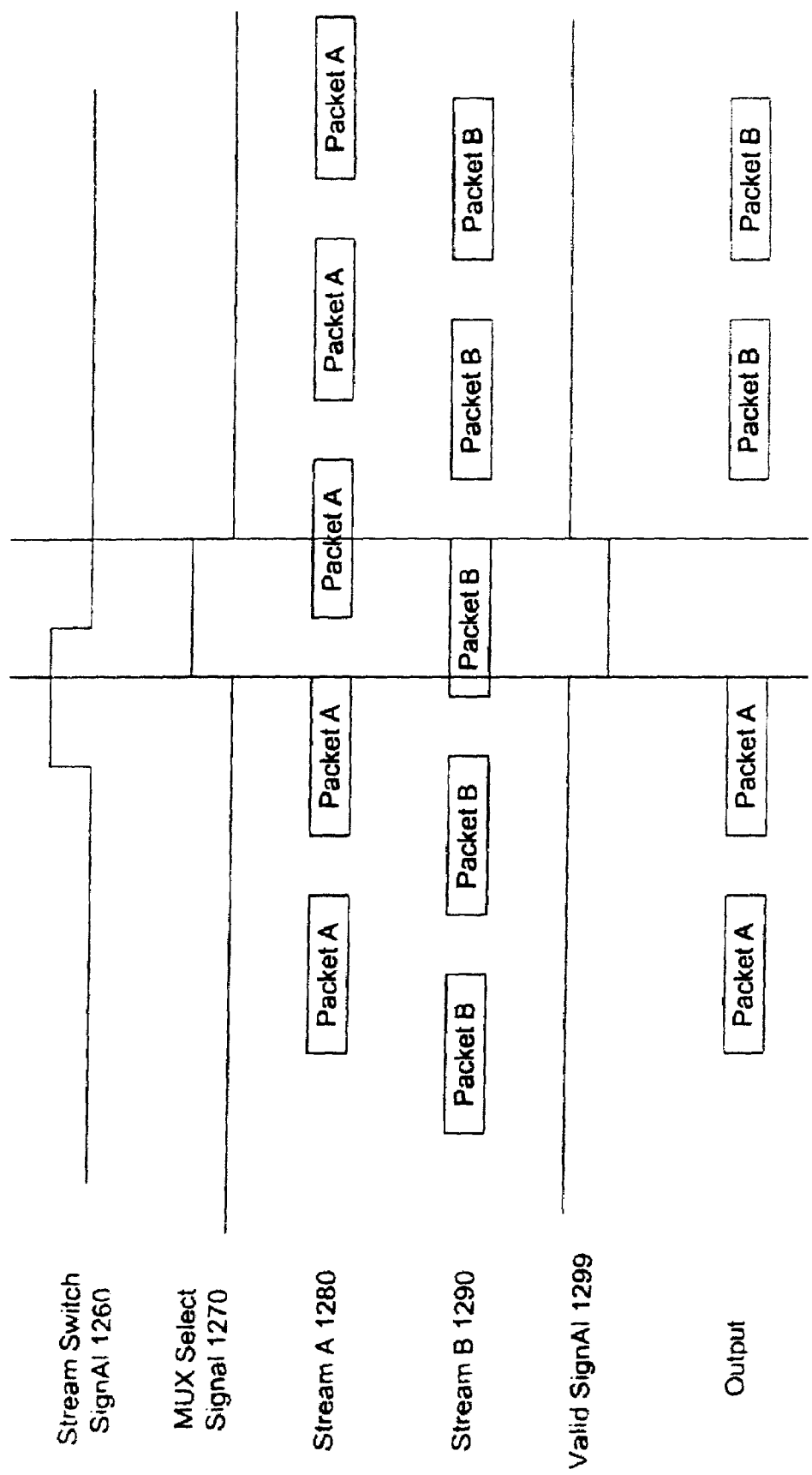
FIG. 12B is an exemplary data diagram, illustrating the packet switching by the switching matrix.

FIG. 12B illustrates one embodiment of the signals. The stream selection is done by a user-programmed external (register) select 1260, which controls an internal select 1270 of the multiplexer. In one embodiment, the internal select 1270 to the multiplexer is activated only after the packet-end signal of the original stream 1280 is seen. Thus, the system does not switch to a new stream 1290 until a packet-end signal of the current packet in the original stream 1280 has been received, so that only complete packets are propagated. In order to ensure that only complete packets are propagated on the new stream 1290 as well, the data valid control 1299 is used. The data valid signal 1299 is changed to the new stream (indicating that the data in the new stream is valid) only after a packet end signal is received on the new stream 1290. This ensures that only complete packets are propagated, from both the original and the new stream.

Figure 13:
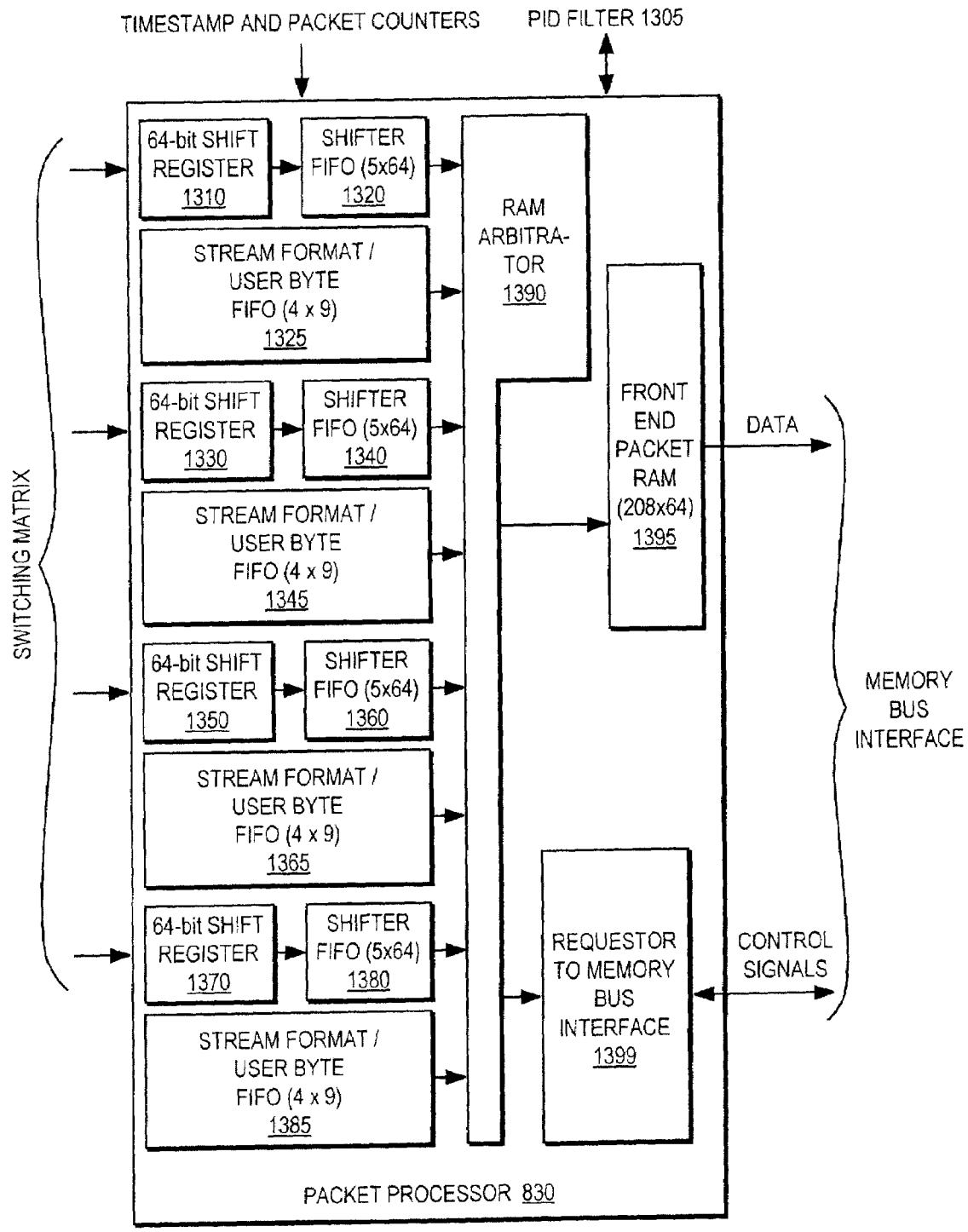
FIG. 13 is a diagram illustrating one embodiment of the packet processor, which is part of the Front-End module.

The Packet Processor, as shown in FIG. 13, contains four sets of circuitry to capture packets for four streams and append header and footer information. In one embodiment, the Packet Processor 830 creates a 208-byte proprietary packet format. Incoming bytes for a stream are first garnered into 64-bit words using the Shift Registers 1310, 1330, 1350, 1370. Contents of the Shift Registers 1310, 1330, 1350, 1370 are moved to their respective Shifter FIFOs 1320, 1340, 1360, 1380. In one embodiment, the Shifter FIFOs 1320, 1340, 1360, 1380 are 5 words deep. From the Shifter FIFOs 1320, 1340, 1360, 1380, the data is written to a Front-End Packet RAM 1395, common among all four streams.

The Shifter FIFOs 1320, 1340, 1360, 1380 hold packet data until the PID value for the ongoing packet is either matched or rejected by the PID Filter. Since the PID Filter requires a 64-cycle delay in the worst case and it is shared among all the four streams, packet data in the Shifter FIFOs 1320, 1340, 1360, 1380 may be held for several cycles. If the PID Filter finds a match for a given packet, all bytes of data in the Shifter FIFO relevant to that packet are written out to the Packet RAM 1395 through the RAM Arbitrator 1390. If the PID filter rejects the PID value, all data for that packet arriving in the Shifter FIFO is thrown away.

The other benefit provided by the Shifter FIFOs 1320, 1340, 11360, 1380 is handling the worst-case arbitration delay. In one embodiment, the 208-word Front-End Packet RAM 1395 is implemented as a single-ported RAM, with eight write clients and a bursty read client. The read client issues requests in large bursts in back-to-back cycles to efficiently transfer complete data packets to the memory through the Memory Bus Interface. Control signals are transferred through requestor 1399 to the Memory Bus Interface. In the arbitration scheme, in one embodiment, the read client has the highest priority, and the other eight clients are arbitrated in a round-robin fashion. In one embodiment, the contents of the Packet RAM 1395 are transferred out to Memory in two separate bursts (of either 10 and 16, 12 and 14, 14 and 12, or 16 and 10; depending on the alignment of the Memory write address within a 16 word page) after all the 208 bytes (208 bytes=26 words) of a packet have been completely written into the Packet RAM 1395.

In one embodiment, the Front-End Packet RAM 1395 has space to store 2 packets for each stream. In one embodiment, only complete packets are written to the Memory since the input stream could stop anywhere within a packet due to various error conditions, and it is important not to propagate incomplete packets through the remainder of the Transport Processing pipeline (that is, Readback, Descrambler, and Transport Demultiplexer). The Packet Processor 830, in one embodiment, also contains small 4×9-bit FIFOs 1325, 1345, 1365, 1385 to store Stream Format and User-Byte information corresponding to a packet. In one embodiment, these are inserted in the header and footer, respectively, of a 208-byte packet.

Figure 14:
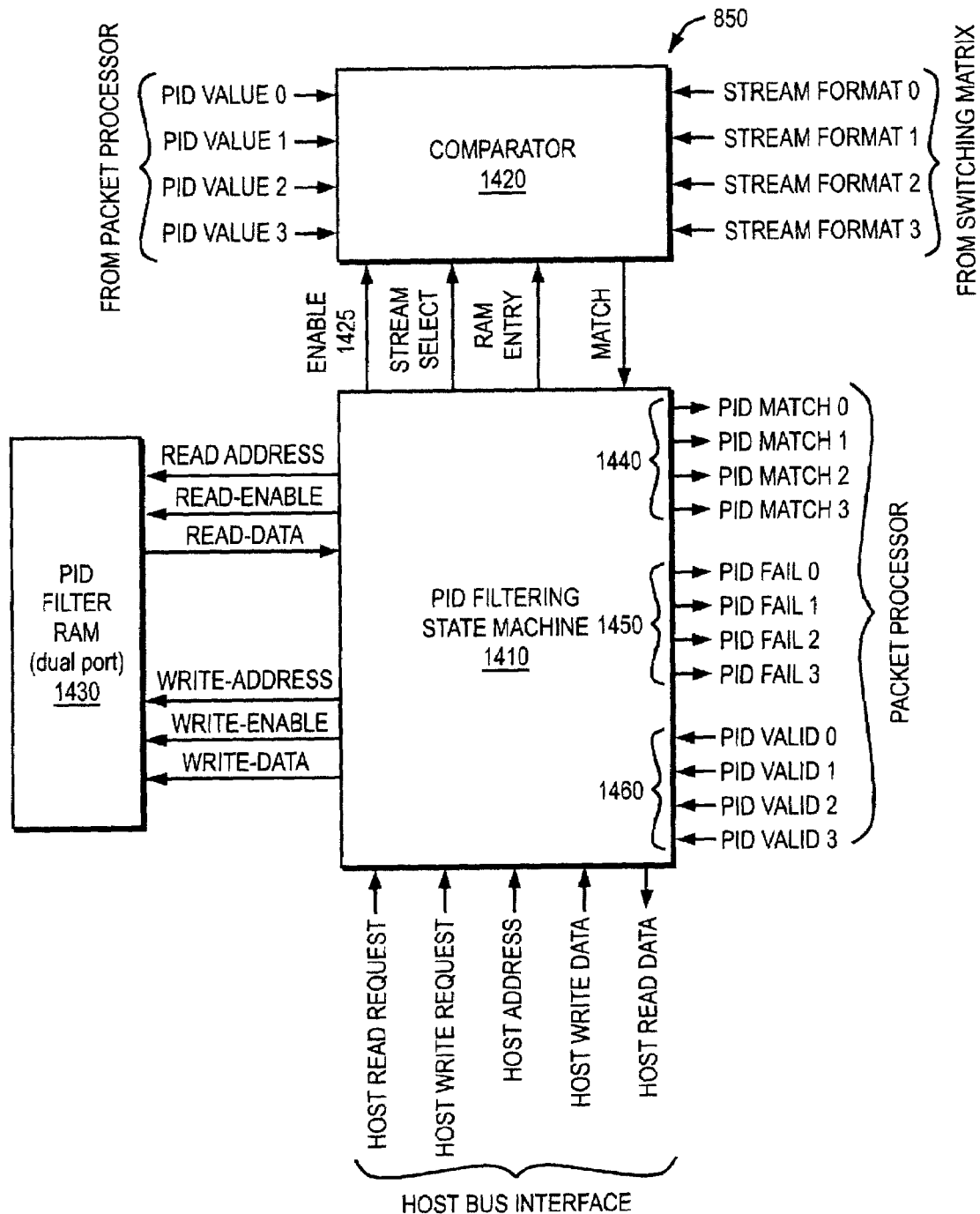
FIG. 14 is a diagram illustrating the PID filter, which is part of the Front-End module, according to one embodiment of the invention.

FIG. 14 illustrates one embodiment of the PID Filter. In one embodiment, the PID filter 850 is capable of handling four streams simultaneously. It accepts four PID Values, the corresponding Stream Format—that is, whether it is a 13-bit PID value for MPEG or a 12-bit SCID (Service Channel Identification) value for DirecTV—and the corresponding PID Valid signals 1460. It has PID Match 1440 and PID Fail 1450 output signals for each stream. The PID values to be matched against are programmable by the user.

In one embodiment, the PID values to be matched are stored in a 64×32 PID Filter RAM 1430. In one embodiment, a total of 128 different PIDs can be programmed by the user. In one embodiment, each 32-bit location of the RAM 1430 contains two different PID values: each 13-bit PID Value has an associated 1-bit enable (to denote that the RAM location is valid) and 2-bit stream ID.

The PID Filter 850 further includes a Comparator 1420 that compares the PID Value from Packet Processor against two separate PID Values in a RAM entry. In one embodiment, there is a single Comparator 1420, and it makes this comparison in a single cycle. This involves comparing a 15-bit value against two separate 15-bit values in parallel and combining the two results. Each 15 bit value contains a 13-bit PID and 2-bit stream ID. The first match causes a rising pulse on the relevant PID Match output signal. Otherwise, the PID Fail signal is asserted after the Comparator 1420 steps through all the PIDs unsuccessfully.

In one embodiment, access from the Host Bus Interface to the PID Filter RAM 1430 is handled by the PID Filtering State Machine 1410. In one embodiment, Host Bus read access is given a higher priority than read access by the Comparator 1420. In one embodiment, the PID Comparator 1420 is stalled whenever a Host Bus read request arrives and is resumed after the read operation is completed. This is controlled by the State Machine 1410 through the "ENABLE" signal 1425 sent to the Comparator 1420. A write operation from the Host Bus Interface does not pause the PID Comparator 1420 since a dual-port RAM 1430 is used, facilitating simultaneous reads (from Comparator) and writes (from Host Bus Interface).

FIG. 15 illustrates one embodiment of the various types of transport streams. The Playback unit reads transport data from a memory buffer and produces transport streams with prescribed data-rates very precisely. The Playback unit can be employed to run in a number of modes depending on the nature of transport data stored in the memory. This data may correspond to full transport 1510, that is, it contains every packet transmitted by the broadcaster or it may be partial transport 1520, 1530, that is, it contains only a subset of packets. For the former case the Playback can be run at a constant known rate. However, for the latter case it is often necessary to recreate a transport stream with gaps corresponding to dropped packets. The MPEG standard (ISO/IEC 13818-1) specifies strict requirements for jitters introduced for packet timing for a transport stream (maximum +/−500 ns). Precise packet timing is also important for maintaining adherence to the MPEG buffer model, preventing buffer overflow and underflow in the decoder.

The first method for partial transport, referred to as the timestamp-per-packet 1520 method, relies on the arrival time (for example, STC—"System Time Clock" Counter Value at the time a packet arrived in Front-End) to be recorded along with every packet stored in Memory. The Playback unit uses this arrival-time information to recreate a partial transport stream precisely. Although this method is loss-less and preserves all the temporal information, it comes at the expense of storage overhead.

For the case of MPEG, as an example, each 188-byte packet requires an additional 42 bits at a minimum for the STC Counter Value, implying about 3% of additional overhead. Additionally, this method may not be applicable if the partial transport data is not stored by the Front-End of the Transport Processor but arrives through an auxiliary channel. For example, a pre-recorded program sent over an Internet connection. In such a case there may not be an opportunity to record the arrival-time information along with every packet.

Another method, referred to as the timestamp-per-chunk 1530 method, addresses these issues by re-creating precise arrival times for only the lead-packet in a chunk of packets, instead of every packet. One common usage model for this method is to make a PCR (Program Clock Reference) packet be the lead of every chunk. Since the content of the PCR packet itself provides the temporal information for the Playback module, there is no additional storage overhead.

One embodiment of the microarchitecture of the Playback unit is shown in FIG. 16. The Playback unit 430 contains a Clock Multiplier 1630, which multiplies the system clock by a programmable factor (say "x"). The Playback unit 430 further includes a DDA Circuit 1620 (Digital Differential Analyzer) with programmable factors "m" and "n", such that the ratio m:m+n governs the number of cycles that the VALID signal remains high on an average. The programmable Clock Multiplier circuit 1630 is designed carefully to achieve precise clock multiplications for odd numbers as well. The Clock Multiplier circuit 1630 is designed to maintain a 50-50 duty-cycle for CLOCK, in one embodiment. The DDA Circuit 1620 de-asserts the VALID signal m out of every m+n CLOCK cycles on an average. A running average technique is employed to match the programmed rate finely.

The Playback unit 430 also contains a simple byte-oriented FIFO 1640 that stores transport data read from the memory through the Memory Bus Interface. In one embodiment, whenever the FIFO 1640 has more than half its locations free, transport data is read from the memory interface module to fill it up. The FIFO 1640 also contains logic to execute the commands issued by the Playback Controller 1610.

The Playback Controller 1610 keeps track of which bytes should be read out or skipped from the FIFO 1640, and when each byte needs to be read out. The Playback Controller 1610 also contains counters to generate the FRAME signal at the beginning of a packet. It issues relevant commands to the FIFO 1640.

For full transport mode, the Playback Controller 1610 requests the FIFO 1640 to "read next byte" on every VALID pulse. In timestamp-per-packet mode since the transport data is annotated with timestamps at the beginning of every transport packet the Playback Controller 1610 has logic to read and interpret these annotations. The Playback Controller 1610 issues the commands "skip byte" or "read next byte". The former is used for reading out timestamps at the beginning of a packet. The Playback Controller 1610 issues a "skip byte" command for the bytes corresponding to the annotations of the packet, e.g. the timestamp in the header portion of the packet.

The STC (System Time Clock) Counter Value is compared with the annotated timestamp of a packet in order to decide when the first byte of the packet should be played. In one embodiment, the STC Counter Value includes a user-programmable STC-time offset. Subsequently, the remaining bytes of the packet are read out from FIFO 1640 using a series of "read next byte" commands on every VALID pulse.

In timestamp-per-chunk mode, the microprocessor (external to the Transport Processor, CPU 155) programs the STC trigger value for the lead packet and the number of packets for every chunk. Since the chunk lengths are typically of the order of a few milliseconds, in one embodiment, there is a shadowed version of every parameter in the Playback unit 430. This means that while the Playback unit 430 is playing out a chunk of packets, the microprocessor can program parameters for the next chunk. As soon as a full chunk is completed, the Playback unit 430 transfers all parameters from the shadowed version of registers to the current working registers. The Playback unit 430 also generates an interrupt to notify the microprocessor that it can program the next set of parameters. This gives enough time for microprocessor to program the relevant parameters in time and prevents any delay in re-programming to ensure the playback at precise rate.

The command issued by Playback Controller 1610 in this mode of operation is only "read next byte", since the FIFO 1640 does not contain any auxiliary annotations. In one embodiment, the Playback Controller 1610 also contains a comparator that signals when STC time crosses a programmed STC Trigger value. This signal is used to send out the first byte of the lead packet in a chunk. Subsequently, every byte of every packet in the chunk is played out by issuing appropriate number of "read next byte" commands to the FIFO 1640.

The Playback unit 430 can recreate transport streams with high precision by suitably choosing values of the programmable parameters "x", "m", and "n". For the sake of illustration let us choose the ATSC data-rate, which is 19.39265846 Mbps. Let us assume that core-clock is 100 MHz, the factor "x" is 8 bits, and the factors "m" and "n" are 10 bits each. With x=22, m=1009, and n=883, the proposed circuitry generates a data-rate of 19.39265808 Mbps.

$$\text{Data Rate (in Megabytes)} = \frac{\text{Input Clock Rate}}{x} * \frac{m}{m+n} =$$
$$\frac{100 \text{ MHz}}{22} * \frac{1009}{1009 + 883} = 2.42408226 \text{ MB/s} * 8 = 19.39265808 \text{ Mbps}$$

At 30 Frames/second, this implies that the Playback unit 430 drops a frame once every 472.5 hours or 20 days of operation.

Another feature that can be implemented within the framework of the proposed Playback microarchitecture is the "one-shot" mode of operation. In this mode the Playback unit 430 reads out the transport stream at a prescribed rate and stops as soon as it reaches the end of a transport buffer in the memory (Memory 135). One set of scenarios where this mode is used is in so-called "pull"—mode applications, where the playback rate is governed by the rate of consumption of the transport stream. For example, if the transport stream produced by the playback unit 430 is being transferred across a network, or is being decoded and displayed at a non-real-time display rate (e.g., slow motion, fast forward, etc.), the output rate may be bursty rather than uniform. In these scenarios, the long-term playback rate is governed by the application consuming the data.

In another set of scenarios, the playback unit 430 can be employed to generate multiple transport streams by running alternately on different transport buffers in the "one-shot" mode, essentially doing time-division multiplexing of different transport streams. This scenario is possible because the playback unit 430 can run an order-of-magnitude faster than what is required for a single transport stream. In this mode of operation, a microprocessor does long-term rate control, and alternately programs the playback unit 430 with different transport buffer parameters.

Figure 17:
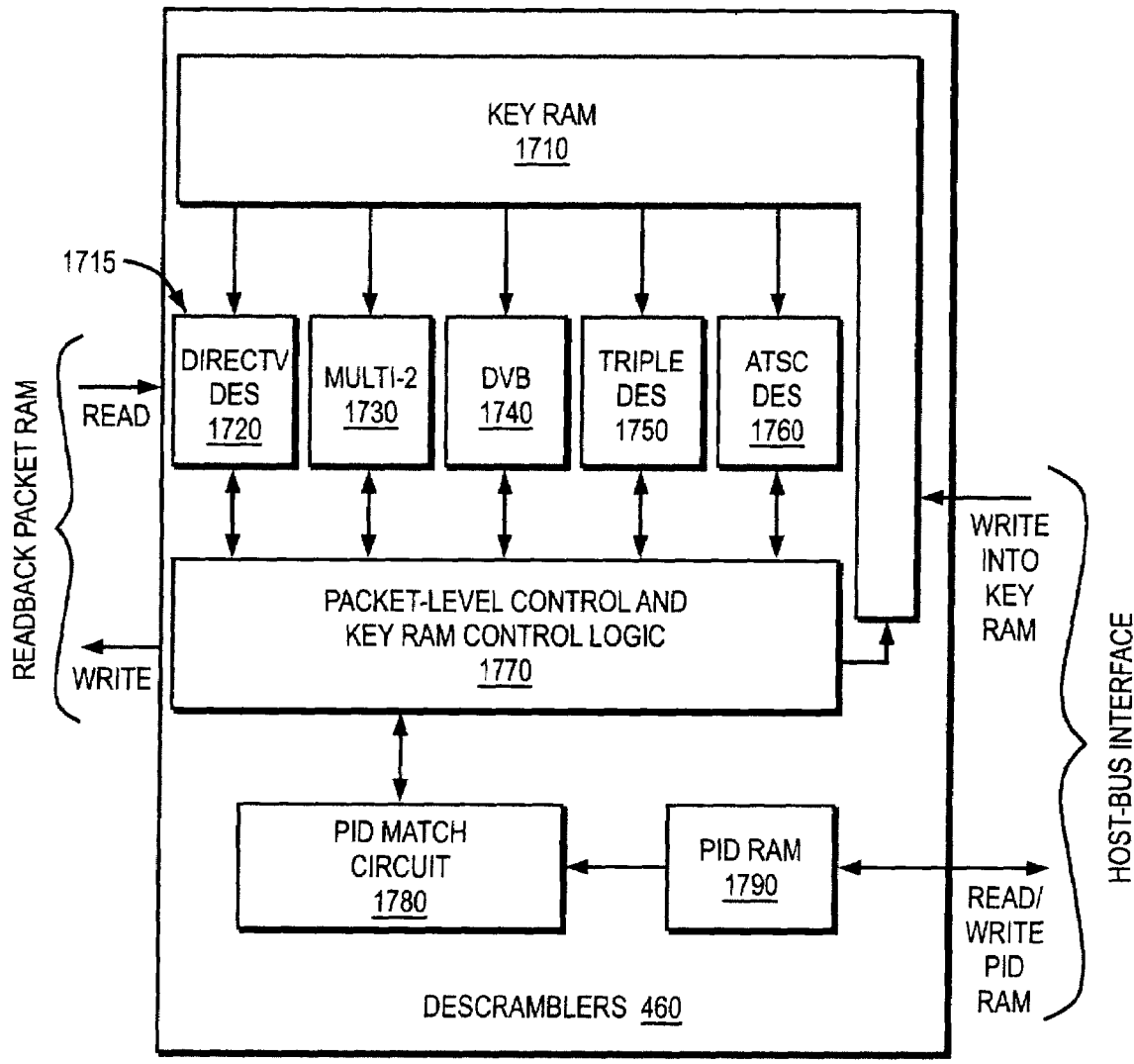
FIG. 17 is a diagram illustrating one embodiment of the Descrambler module, which is part of the Transport Processor.

One embodiment of the microarchitecture of the Descrambler module is shown in FIG. 17. In one embodiment, the Descrambler module 460 provides five types of descrambling functions: DirecTV DES 1720 (used by DirecTV transport in US), Multi-2 1730 (Japan), DVB 1740 (Europe and Echostar, US), Triple DES 1750 (Cable, Terrestrial), and MPEG DES 1760 (Cable). Alternately, a subset or superset of descrambling functions may be provided.

In one embodiment, using one set of the decipher circuitry, the Descrambler module 460 maintains contexts for four transport streams. For each context, the Descrambler module 460 provides an address range in the Key RAM 1710 to store keys. In one embodiment, the address range in the Key Ram 1710 stores 12 pairs of 64-bit keys, that is, an odd key and an even key for each of the 12 PIDs for which descrambling is performed. In one embodiment, the PID RAM 1790 stores 12 PID values for each stream. In one embodiment, to improve security, the Key RAM 1710 is made write-only by the Host (CPU 155).

The Descrambler module 460 reads a scrambled transport packet from the 3-packet deep Readback Packet RAM (not shown), and writes descrambled packet back into the Readback Packet RAM. The Readback Packet RAM, in one embodiment, contains 208-byte packets, the header of which contains a 2-bit Stream ID, as described earlier. This determines which one of the four sets of keys associated with the PID is used to descramble the packet. The Packet-Level Control and Key RAM Control Logic 1770 chooses between odd and even key by examining the scrambling-control bits in the packet.

The Packet-Level Control and Key RAM Control Logic 1770 contains circuitry to perform transport packet parsing, enough so as to be able to determine: (a) Does the PID of a packet match one of the programmed PIDs (using the PID Match Circuit 1780), (b) Is a packet scrambled, (c) Which key should be used for descrambling, (d) What parts of a packet are scrambled, that is, does the packet contain adaptation field and if yes, how long is it, (e) Does a packet have error bit set.

If the PID does not match one of the programmed PIDs, then it is bypassed (not descrambled). If the packet is not scrambled, it is passed through. For scrambled packets, the appropriate key is identified and used to descramble the packet. Only the portion of the packet that is scrambled is descrambled. Therefore, the system determines which portions of the packet are scrambled. The system skips over the variable length adaptation field, if present. The Packet-Level Control and Key RAM Control Logic 1770 bypasses the packets with the error bit set to one. For a packet that requires descrambling, in one embodiment, the Control Logic 1770 breaks down scrambled part of the packet into 64-bit chunks and invokes a relevant decipher circuitry 1715 for each chunk.

In on embodiment, each decipher circuitry 1715 takes as input a 64-bit scrambled chunk and returns a 64-bit descrambled output. In one embodiment, the Triple DES decipher engine 1750 is reused for all the three DES-related descrambling functions. In one embodiment, the Triple-DES descrambling function is implemented by invoking the DES decipher engine 1750 three times, thereby reducing the descrambling throughput by a factor of 3.

FIG. 18 shows the throughput of our implementation of the five descrambling functions. The first table shows throughput in Megabits-per-second for the five descrambling algorithms at different core-clock frequencies. The second table shows number of transport streams that can be descrambled for various common broadcast cases. The third table shows number of standard-definition and high-definition programs that can be descrambled for each descrambling algorithm at different core-clock frequencies.

Figure 19:
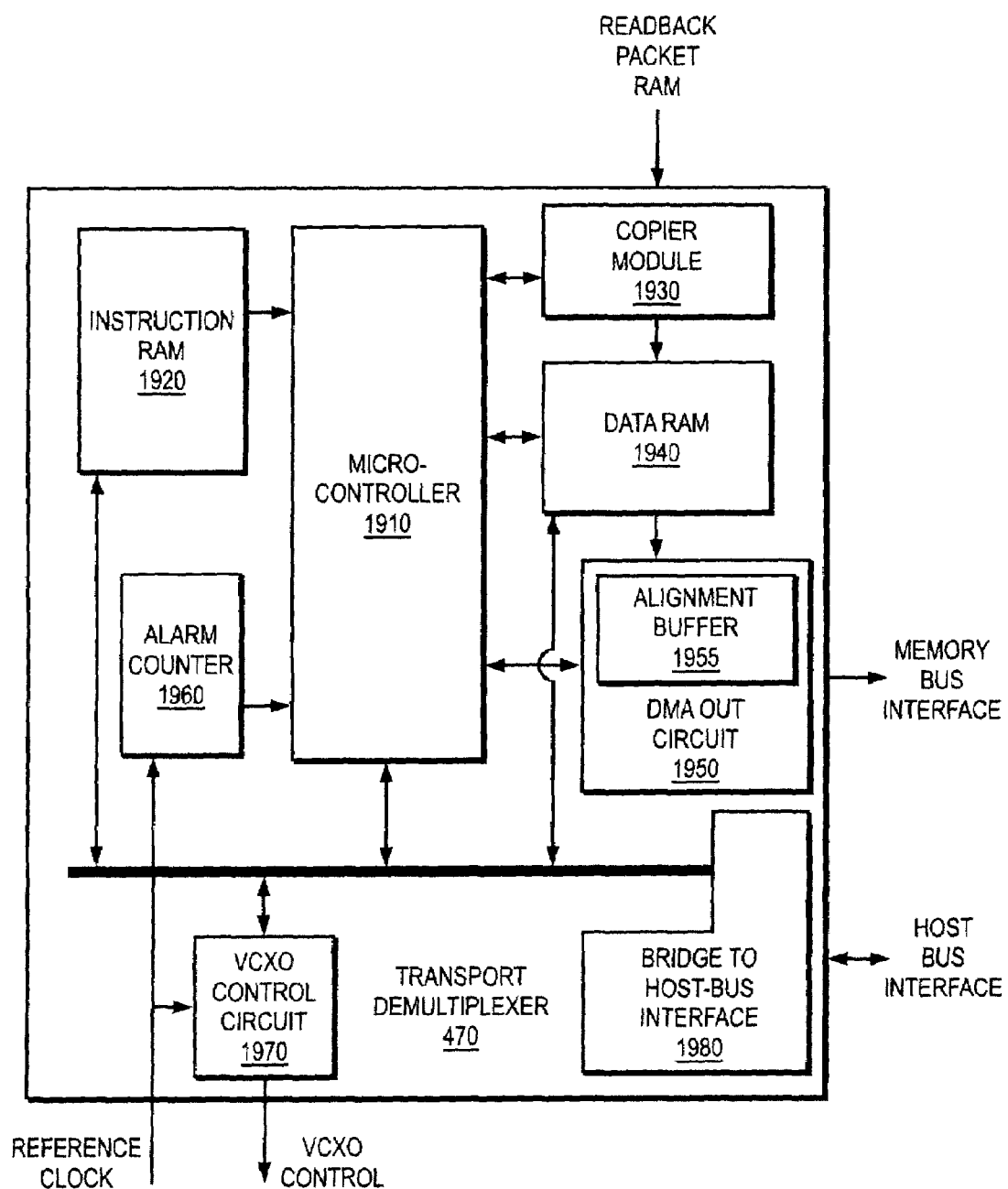
FIG. 19 is a diagram illustrating one embodiment of the Transport Demultiplexer module, which is part of the Transport Processor.

FIG. 19 is a block diagram of one embodiment of the Transport Demultiplexer. The Transport Demultiplexer 470 is capable of parsing transport packets and binning their contents into separate memory buffers based on PID values. In one embodiment, the Transport Demultiplexer 470 also provides a number of application specific functionalities, such as PSI (packet switching interface) filtering, private data capture, PVR (personal video recorder) functionalities, etc. Since the Transport Demultiplexer 470 has to deal with multiple standards (MPEG, DirecTV, ATSC, ARIB, Cable, Terrestrial), multiple streams, and evolving application-specific features, in one embodiment, it is implemented with a general-purpose Microcontroller 1910. Thus, the Transport Demultiplexer 470 is programmable, if new standards are implemented. In one embodiment, the Microcontroller is a 16-bit microcontroller.

In one embodiment, the basic dataflow within the Transport Demultiplexer 470 consists of three stages: (a) Copier Module 1930 writes transport packets one-by-one from Readback Packet RAM into Data RAM 1940, (b) Microcontroller 1910 processes packets from Data RAM 1940 and produces demultiplexed output(s) in Data RAM 1940, and (c) DMA Out Circuit 1950 reads demultiplexed output(s) from Data RAM 1940 and writes into relevant Memory buffer(s) through Memory Bus Interface. In one embodiment, the Transport Demultiplexer 470 also contains a VCXO Control Circuit 1970 to fine-tune the external clock crystal used by the system. In one embodiment, the external clock crystal is 27 MHz. Fine-tuning is done through a one-bit Pulse-Width-Modulated output signal VCXO CONTROL. In one embodiment the Transport Demultiplexer 470 contains two instantiations of the VCXO Control Circuit 1970 to support dual high-definition display in multi-tuner and multi-channel applications.

The Alarm Counter 1960 is a general-purpose free-running counter to assist the Microcontroller 1910 in performing certain demultiplexing functions. Control registers and RAM contents are programmed through the Bridge to the Host Interface Bus 1980. In one embodiment, the Transport Demultiplexer 470 internally has a 16-bit bus to transfer data from one sub-module to another.

The Microcontroller 1910, besides processing packets stored in the Data RAM 1940, also provides the controls to facilitate and synchronize the DMA-In (from Copier module 1930) and DMA-Out 1950 channels by setting up relevant DMA channel registers (not shown). The Alignment Buffer 1955 within the DMA Out 1950 keeps track of alignment of the write addresses, and optimizes on the burst size to make data transfers on the Memory Bus efficient.

In one embodiment, the Instruction RAM 1920 is a 12 Kilobyte single-port Instruction RAM that stores firmware for both for MPEG and DirecTV transport standards. In one embodiment, the Data RAM 1940 is implemented as 16 Kilobyte dual-ported (2 Read and 2 Write ports) RAM. The Data RAM 1940 is dual-ported since there are a number of read and write clients, some of which need efficient access to the Data RAM 1940. The Microcontroller 1910 can make both read and write requests to the Data RAM 1940, similar to the HOST (CPU 155). Furthermore, the Copier Module 1930 makes only write requests whereas the DMA Out circuit 1950 makes only read requests. It is disadvantageous to have the Microcontroller 1910 stalled on either read or write accesses to the Data RAM 1940, since it directly impacts the demultiplexing throughput. Likewise the DMA channels issue read and write requests in bursts and require Data RAM 1940 access in back-to-back cycles, albeit infrequently. The HOST (CPU 155) accesses, on the other hand, can be stalled since they are not critical.

Figure 20:
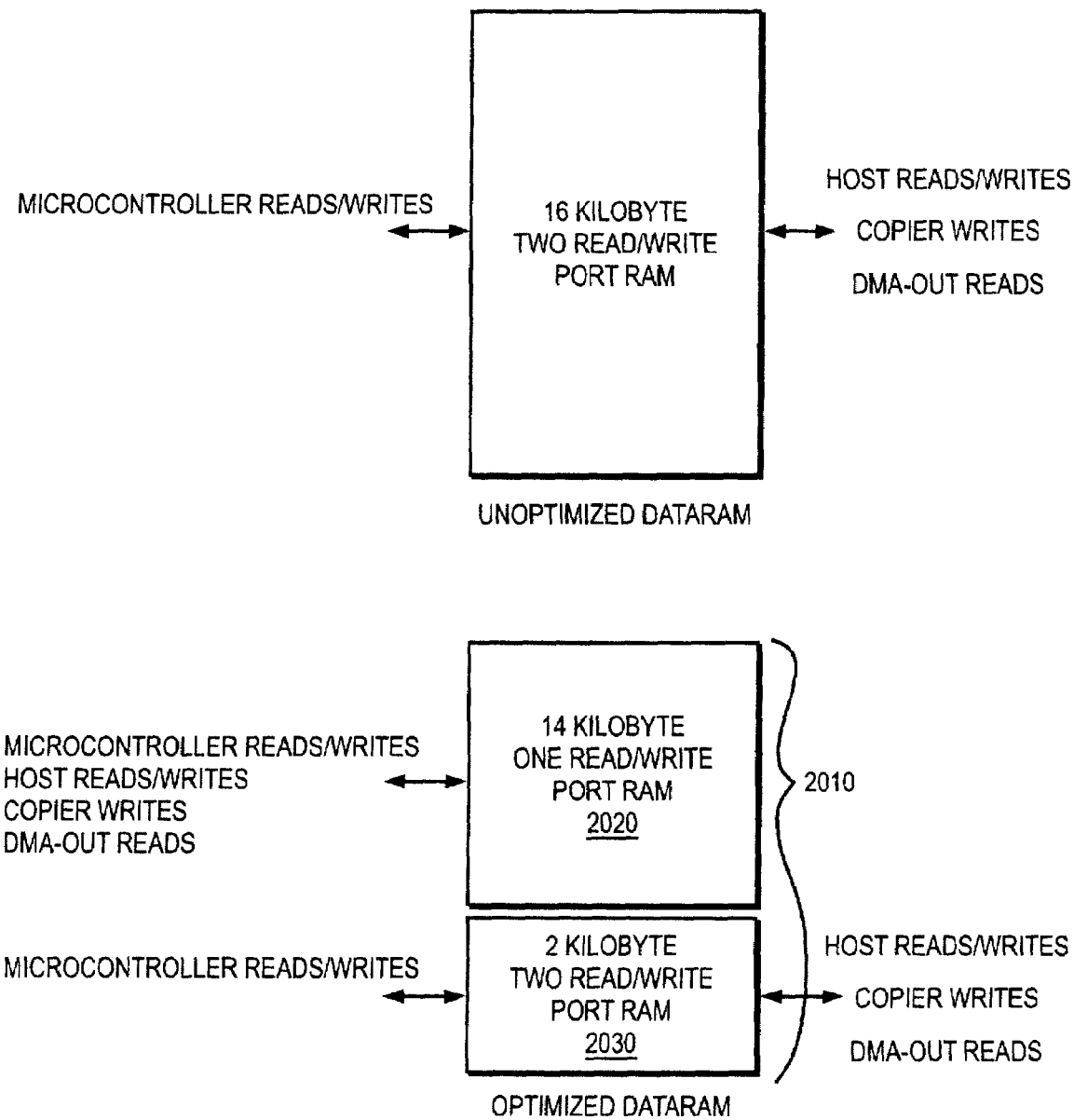
FIG. 20 is a diagram illustrating one embodiment of the size optimization of the Data RAM in the Transport Demultiplexer.

Given these characteristics, the straightforward dual-ported RAM implementation can be optimized to reduce the RAM area. This optimization scheme is illustrated in FIG. 20. If DMA read access is restricted to only a localized portion 2030 of the Data RAM 2010, then the Data RAM 2010 may be implemented with only that portion 2030 having dual-port capabilities. In one embodiment, the optimized scheme assumes that DMA read accesses are limited to only a portion of the RAM. For example, the DMA accesses may be restricted to the lower 2 Kilobytes of a 16 Kbyte RAM. Therefore only 2 Kbytes out of 16 Kbytes is implemented as dual ported RAM. This scheme, in one implementation, saved 30% area for the Data RAM.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A transport processor comprising:
    a front end to receive concurrently a plurality of transport streams, where two or more of the plurality of transport streams have different formats, each transport stream including a plurality of packets, the front end comprising a packet processor to create an aggregate transport stream in a single format from the plurality of transport streams; and
    a memory interface through which the transport processor can store the aggregate transport stream in a memory for use by subsequent decode and display operations.

2. The transport processor of claim 1, wherein the number of streams within the aggregate transport stream is scaleable.

3. The transport processor of claim 1, wherein the front end further comprises:
    a PID filter to discard packets in the aggregate transport stream prior to processing, in order to minimize memory bandwidth and improve descrambling and demultiplexing throughput.

4. The transport processor of claim 1, wherein the aggregation of transport streams permits the use of a single PID filter, a single descrambler, and a single demultiplexer.

5. The transport processor of claim 1, further comprising:
    a descrambler to descramble the packets in the aggregate transport stream.

6. The transport processor of claim 5, wherein the descrambler comprises:
    a packet level control and key RAM control logic to select a descrambling standard for a packet within the aggregate transport stream; and
    a decryption circuit to descramble the packet using the selected descrambling standard.

7. The transport processor of claim 1, wherein:
    the packet processor further is to format each packet from the plurality of transport streams to said single format prior to storing the aggregate transport stream in the memory.

8. The transport processor of claim 7, wherein the single format is a 208-byte format, and packets with fewer than 208 bytes are padded to comply with the single format.

9. The transport processor of claim 7, wherein the single format includes originating stream information that comprises temporal information.

10. The transport processor of claim 7, wherein the single format includes originating stream information that comprises stream identifier and additional user specified information.

11. The transport processor of claim 7, wherein the single format includes originating stream information.

12. The transport processor of claim 1, wherein the aggregate stream includes transport data obtained from different transport protocol standards.

13. The transport processor of claim 1, further comprising:
a plurality of input/output (I/O) ports;
an I/O port that is user-selectable to a parallel or serial format.

14. The transport processor of claim 13, wherein the I/O ports comprise:
a serial output block to resample parallel data, and to convert the parallel data to serial data with an independently programmable bit clock selection.

15. The transport processor of claim 1, further comprising:
a PID filter to discard packets from the aggregate transport stream, retaining only packets of interest;
a descrambler to descramble the remaining packets in the aggregate stream; and
a demultiplexer to demultiplex the descrambled packets in the aggregate stream;
wherein the descrambler and the demultiplexer receive only the packets of interest.

16. The transport processor of claim 1, further comprising:
a switching matrix to select a subset of the streams out of a plurality of streams for storage and subsequent descrambling and demultiplexing.

17. The transport processor of claim 16, wherein the switching matrix comprises:
a delay circuit to switch to a new stream after receiving an end of packet signal from an original stream, such that only complete packets from the original stream are propagated.

18. The transport processor of claim 17, wherein the switching matrix further comprises:
a data valid signal to indicate that the output of the switching matrix is valid only after an end of packet signal is received from the new stream, such that only complete packets from the new stream are propagated.

19. The transport processor of claim 1, further comprising:
a demultiplixer to demultiplex an aggregate transport stream retrieved from the memory, into a plurality of different streams, for use by said decode and display operations.

20. The transport processor of claim 19, further comprising a descrambler to receive the aggregate transport stream from the memory via the memory interface and to provide a descrambled version of the aggregate transport stream to the demultiplexer.

21. A system on a chip (SOC) comprising:
a transport processor to PID filter, descramble, and demultiplex a plurality of transport streams, the transport processor including:
a front end to concurrently receive a plurality of transport streams, where two or more of the transport streams have different formats, and
a packet processor to create an aggregate transport stream having a single format from the plurality of transport streams;
a memory to store demultiplexed outputs of the plurality of transport streams;
and an output processor to retrieve one or more demultiplexed outputs from the memory and perform audio/video decode and display functions simultaneously.

22. The SOC of claim 21, wherein the output processor is a combination of digital audio decoder, digital video decoder, audio processor, and display processor.

23. The SOC of claim 22, wherein the audio and video frames for two independent transport streams are rendered without repeated or skipped frames.

24. The SOC of claim 21, wherein the transport processor further comprises:
a readback logic to read packets from the memory, for descrambling and demultiplexing functions.

25. The SOC of claim 21, further comprising a memory interface for use by the transport processor and the output processor to access contents of the memory.

26. A front end in a transport processor to receive a plurality of transport streams from digital receivers, comprising:
a switching matrix to receive concurrently the plurality of transport streams, where two or more of the plurality of transport streams have different formats, and to output a programmable subset of the plurality of transport streams;
a packet processor to receive the subset of the plurality of transport streams and to aggregate the subset of the plurality of streams into a single aggregate transport stream in a single format.

27. The front end of claim 26, further comprising:
a memory to store the aggregate transport stream.

28. The front end of claim 27, further comprising:
a PID filter to discard packets, retaining only packets of interest.

29. The front end of claim 27, further comprising:
an external input/output (I/O) to receive the plurality of transport streams, the external I/O having a plurality of bi-directional ports.

30. The front end of claim 29, wherein each of the bi-directional ports can be configured as either a single parallel or a pair of serial ports.

31. The front end of claim 30, wherein a bi-directional port includes a serial input block to receive serial input and generate a synchronized parallel output.

32. The front end of claim 30, wherein a bi-directional port includes a serial output block to generate a serial transport stream with an independent bit clock for output.

33. The front end of claim 26, wherein the switching matrix comprises:
a stream select delay unit to ensure that only compete packets are propagated.

34. The front end of claim 26, wherein the packet processor is further to attach appropriate header and footer information to transport packets in the subset of the plurality of transport streams.

35. The packet processor in the front end of claim 34, wherein the packet processor generates packets of a uniform size, regardless of originating protocol.

36. A digital audio/video receiver system comprising, on a single chip:

a transport processor including:
- a front end, the front end including:
  - a switching matrix to receive concurrently a plurality of transport streams, including video and audio, each including a plurality of packets, where two or more of the plurality of transport streams have different media formats, each transport stream including a plurality of packets,
  - a PID filter to filter out packets that do not meet specified criteria, and
  - a packet processor to create an aggregate transport stream in a single format from the plurality of transport streams;
- a memory interface through which the transport processor can store the aggregate transport stream in a memory for subsequent processing;
- a descrambler to descramble packets read from the memory, and
- a demultiplixer to demultiplex packets read from the memory, for use by subsequent decode and display operations;

a digital decoder to perform video processing functions including decompression of video received from the memory and to store processed video in the memory;

an audio processor to perform audio processing functions including audio decompression on audio received from the memory and to generate an audio output of said digital audio/video receiver system;

a graphics processor to process graphics;

and a display processor to produce a display output of said digital audio/video receiver system by combining processed graphics and video from a plurality of sources to generate a display in any of a plurality of different display formats.

37. A method comprising:

receiving concurrently, in a digital audio/video receiver system, a plurality of transport streams which have a plurality of different formats, each transport stream including a plurality of packets;

creating an aggregate transport stream in a single format from the plurality of transport streams in said digital audio/video receiver system; and storing the aggregate transport stream in a memory for use by subsequent decode and display operations.

38. The method of claim 37, further comprising:

demultiplexing an aggregate transport stream retrieved from the memory into a plurality of different streams, for use by said decode and display operations.

39. The method of claim 38, further comprising:

descrambling the aggregate transport stream retrieved from the memory.

\* \* \* \* \*

UNITED STATES PATENT AND TRADEMARK OFFICE
CERTIFICATE OF CORRECTION

PATENT NO.         : 7,334,132 B1  
APPLICATION NO. : 10/608301  
DATED                 : February 19, 2008  
INVENTOR(S)       : Kumar et al.

Page 1 of 1

It is certified that error appears in the above-identified patent and that said Letters Patent is hereby corrected as shown below:

On Sheet 12 of 19, in Fig. 12B, line 2, delete "SignAl" and insert -- Signal --, therefor.

On Sheet 12 of 19, in Fig. 12B, line 7, delete "SignAl" and insert -- Signal --, therefor.

In column 2, line 25, after "module" insert -- . --.

In column 2, line 28, after "invention" insert -- . --.

In column 7, line 11, before "data" delete "(".

In column 12, line 34, delete "11360," and insert -- 1360, --, therefor.

In column 19, line 55, in Claim 19, delete "demultiplixer" and insert -- demultiplexer --, therefor.

In column 20, line 57, in Claim 33, delete "compete" and insert -- complete --, therefor.

In column 21, line 20, in Claim 36, delete "demultiplixer" and insert -- demultiplexer --, therefor.

Signed and Sealed this

Twenty-fourth Day of February, 2009

JOHN DOLL  
*Acting Director of the United States Patent and Trademark Office*